US012405615B2

(12) United States Patent
Youmans et al.

(10) Patent No.: US 12,405,615 B2
(45) Date of Patent: Sep. 2, 2025

(54) CLOUD AND HYBRID-CLOUD FLIGHT VEHICLE AND ROBOTIC CONTROL SYSTEM AI AND ML ENABLED CLOUD-BASED SOFTWARE AND DATA SYSTEM METHOD FOR THE OPTIMIZATION AND DISTRIBUTION OF FLIGHT CONTROL AND ROBOTIC SYSTEM SOLUTIONS AND CAPABILITIES

(71) Applicants: Thomas Andrew Youmans, Santa Monica, CA (US); Thomas Bradford Doermer Callen, Pasadena, CA (US); James Croughan, Los Angeles, CA (US)

(72) Inventors: Thomas Andrew Youmans, Santa Monica, CA (US); Thomas Bradford Doermer Callen, Pasadena, CA (US); James Croughan, Los Angeles, CA (US)

(73) Assignee: RHOMAN AEROSPACE CORPORATION, Pasadena, CA (US)

( * ) Notice: Subject to any disclaimer, the term of this patent is extended or adjusted under 35 U.S.C. 154(b) by 0 days.

(21) Appl. No.: 17/833,420

(22) Filed: Jun. 6, 2022

(65) Prior Publication Data
US 2022/0390964 A1 Dec. 8, 2022

Related U.S. Application Data

(60) Provisional application No. 63/196,689, filed on Jun. 4, 2021.

(51) Int. Cl.
G01C 21/20 (2006.01)
G01C 21/00 (2006.01)
(Continued)

(52) U.S. Cl.
CPC ............ G05D 1/104 (2013.01); G01C 21/005 (2013.01); G01C 21/20 (2013.01); G05D 1/0016 (2013.01);
(Continued)

(58) Field of Classification Search
CPC ................ B64U 10/13; B64U 2101/00; B64U 2201/10; B64U 2201/00; G05D 1/104;
(Continued)

(56) References Cited

U.S. PATENT DOCUMENTS 8,577,518 B2 * 11/2013 Linden ................... H04N 5/772
396/419
9,336,240 B2 * 5/2016 Bhatt .................. G06F 3/04883
(Continued)

FOREIGN PATENT DOCUMENTS

WO 2018/035508 A1 2/2018

OTHER PUBLICATIONS

Non-Final Office Action mailed Jun. 18, 2024, in U.S. Appl. No. 18/523,180 (35 pages).
(Continued)

Primary Examiner — Dino Kujundzic
(74) Attorney, Agent, or Firm — Smith, Gambrell & Russell, LLP

(57) ABSTRACT

A robotic vehicle management system for the control, optimization and distribution of robotic vehicles is presented in which vehicle operational data is recorded and used to model and optimize a vehicle's travel path. A process for receiving data from multiple vehicles is disclosed, wherein the recorded data is used in the optimization of control systems with regards to travel path, fuel savings, safety, and other considerations. The recorded data may be used to improve system operations or operations of individual vehicles. Methods and techniques are also provided for (Continued)

Figure 1:
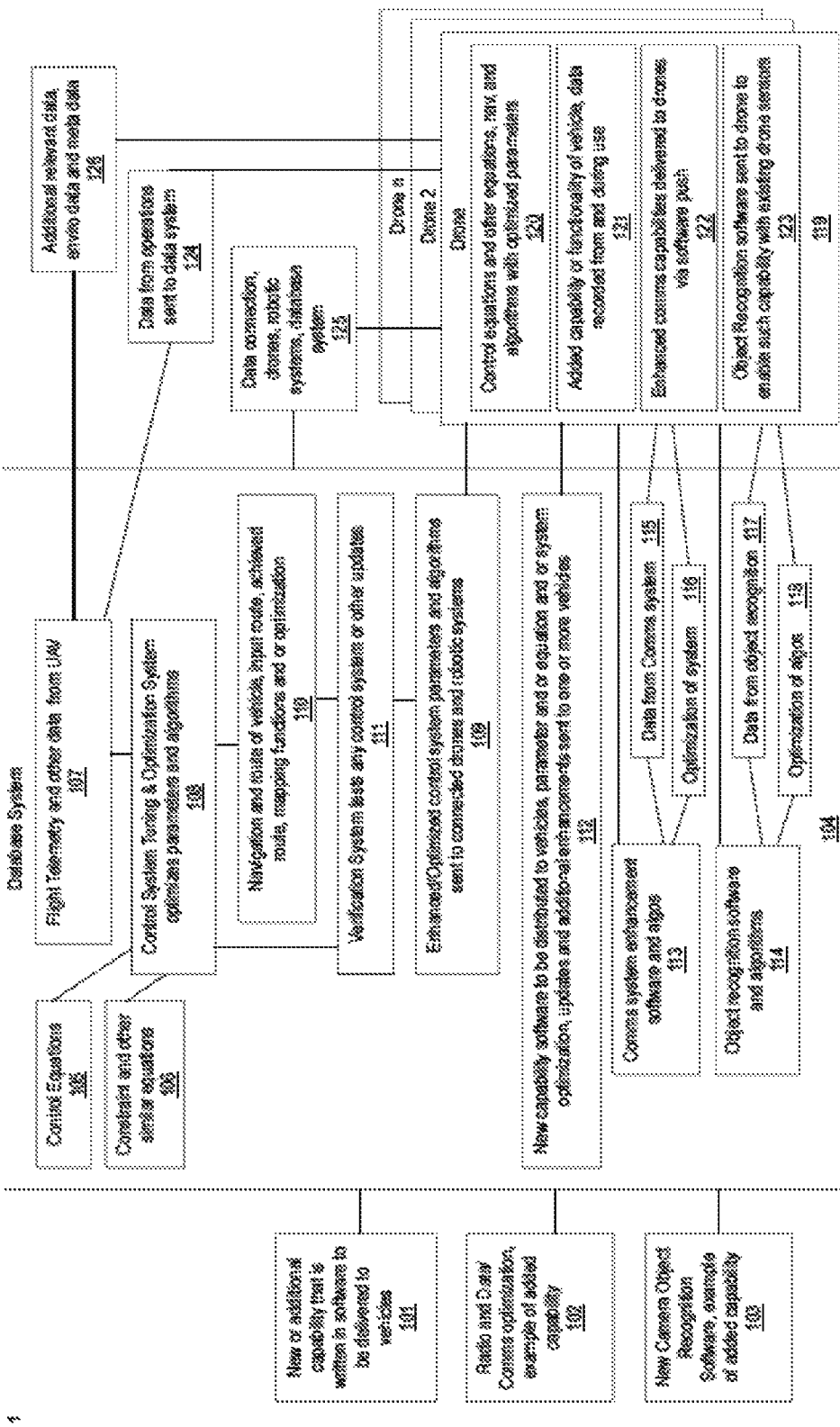

reading data from vehicle sensors, applying analysis techniques to this data, and uploading improved operational processes to one or more vehicles or to a fleet of vehicles. Adaptive controls, learning based controls, navigation system and other capabilities may be included for optimization and distribution by this discloses system and methods.

19 Claims, 7 Drawing Sheets

(51) Int. Cl.
  *G05D 1/00* (2006.01)
  *B64U 101/30* (2023.01)
(52) U.S. Cl.
  CPC ....... *G05D 1/0027* (2013.01); *B64U 2101/30* (2023.01); *B64U 2201/00* (2023.01); *B64U 2201/20* (2023.01)
(58) Field of Classification Search
  CPC .... G05D 1/0022; G05D 1/101; G05D 1/0011; G05D 1/0278; B64C 39/024
  See application file for complete search history.

(56) References Cited

U.S. PATENT DOCUMENTS

| | | | |
|---|---|---|---|
| 9,420,275 B2* | 8/2016 | Morin | G01C 21/20 |
| 9,779,309 B1* | 10/2017 | Fink | G06F 16/7867 |
| 10,217,188 B2* | 2/2019 | Ritter | G06T 3/4038 |
| 10,466,069 B1* | 11/2019 | Kirksey | G08G 5/0052 |
| 10,795,380 B1* | 10/2020 | Patton | G08G 5/0039 |
| 10,802,135 B2* | 10/2020 | Phillips | G01C 21/1656 |
| 10,949,669 B2* | 3/2021 | Lerman | G06F 16/29 |
| 10,951,854 B2* | 3/2021 | Casey | H04N 1/32101 |
| 11,074,447 B1* | 7/2021 | Fox | G08G 5/0013 |
| 11,155,348 B2* | 10/2021 | Kanji | G06F 16/58 |
| 11,187,555 B2* | 11/2021 | Noy | G06V 20/13 |
| 11,215,462 B2* | 1/2022 | Mittal | G06T 7/74 |
| 11,492,113 B1* | 11/2022 | Kipurs | G05D 1/106 |
| 11,565,807 B1* | 1/2023 | Zuckerman | B64C 39/024 |
| 11,866,167 B2 | 1/2024 | Youmans et al. | |
| 2005/0078174 A1* | 4/2005 | Casey | H04N 5/76 348/61 |
| 2008/0036652 A1* | 2/2008 | Shore | E21B 47/0232 342/357.62 |
| 2008/0154504 A1* | 6/2008 | Hein | G01S 1/68 701/300 |
| 2009/0115862 A1* | 5/2009 | Andersson | G09B 29/106 348/222.1 |
| 2011/0064312 A1* | 3/2011 | Janky | G06T 7/74 382/195 |
| 2011/0173565 A1* | 7/2011 | Ofek | G09B 29/00 715/781 |
| 2011/0282575 A1* | 11/2011 | Masuda | G01C 21/3626 701/533 |
| 2012/0310968 A1* | 12/2012 | Tseng | G06F 16/583 707/769 |
| 2013/0243250 A1* | 9/2013 | France | G06V 20/10 382/103 |
| 2014/0118536 A1* | 5/2014 | Morin | H04N 1/32117 348/135 |
| 2014/0267723 A1* | 9/2014 | Davidson, Jr. | G06T 19/006 345/632 |
| 2015/0036870 A1* | 2/2015 | Mundhenk | G06V 20/176 382/100 |
| 2015/0221079 A1* | 8/2015 | Schultz | G01S 7/4808 382/190 |
| 2015/0248783 A1* | 9/2015 | Fayle | H04W 4/02 345/633 |
| 2015/0363717 A1* | 12/2015 | Lim | G06Q 10/10 705/4 |
| 2015/0370251 A1* | 12/2015 | Siegel | B64C 39/024 701/2 |
| 2016/0140851 A1* | 5/2016 | Levy | G08G 5/0069 701/410 |
| 2016/0162809 A1* | 6/2016 | Turner | H04W 4/021 705/5 |
| 2016/0275801 A1* | 9/2016 | Kopardekar | G08G 5/0082 |
| 2016/0293018 A1* | 10/2016 | Kim | G08G 5/0052 |
| 2016/0300386 A1* | 10/2016 | Bostick | G11B 27/10 |
| 2016/0350927 A1 | 12/2016 | Ma | |
| 2016/0371985 A1* | 12/2016 | Kotecha | G08G 5/0034 |
| 2017/0102699 A1* | 4/2017 | Anderson | G05D 1/0016 |
| 2017/0243399 A1* | 8/2017 | Troy | G06T 19/003 |
| 2017/0301373 A1* | 10/2017 | Tran | B64D 47/08 |
| 2017/0336203 A1* | 11/2017 | Barnes | G01S 17/88 |
| 2018/0025044 A1* | 1/2018 | Hostetter | G08G 5/0043 707/690 |
| 2018/0054604 A1* | 2/2018 | Boyd | H04N 13/243 |
| 2018/0094935 A1* | 4/2018 | O'Brien | G06K 7/1404 |
| 2018/0096541 A1* | 4/2018 | O'Brien | G05D 1/0088 |
| 2018/0097796 A1* | 4/2018 | Thompson | H04W 4/02 |
| 2018/0136332 A1* | 5/2018 | Barfield, Jr. | G06V 10/7784 |
| 2018/0239991 A1 | 8/2018 | Weller et al. | |
| 2018/0249168 A1* | 8/2018 | Loyd | H04N 21/422 |
| 2018/0292214 A1 | 10/2018 | Zhang | |
| 2018/0292541 A1* | 10/2018 | De Silva | G01S 17/06 |
| 2018/0319495 A1* | 11/2018 | Tu | H04W 84/06 |
| 2018/0349522 A1* | 12/2018 | Aphek | G06F 30/13 |
| 2019/0011934 A1* | 1/2019 | DeBitetto | B64C 39/024 |
| 2019/0043372 A1* | 2/2019 | Winkle | G08G 5/0008 |
| 2019/0065951 A1* | 2/2019 | Luo | G06N 3/045 |
| 2019/0080142 A1* | 3/2019 | Abeywardena | G01C 21/3852 |
| 2019/0120928 A1* | 4/2019 | O'Shea | G01S 5/0236 |
| 2019/0156081 A1* | 5/2019 | Pous | G06K 19/0723 |
| 2019/0156640 A1* | 5/2019 | Cutcher | G08B 21/0423 |
| 2019/0251352 A1* | 8/2019 | Hovden | G06T 3/153 |
| 2019/0265705 A1* | 8/2019 | Zhang | B64C 39/024 |
| 2019/0266297 A1* | 8/2019 | Krause | G06F 21/566 |
| 2019/0293450 A1* | 9/2019 | Hino | G05D 1/101 |
| 2019/0333378 A1* | 10/2019 | Luzifovich | G08G 1/052 |
| 2019/0385361 A1* | 12/2019 | Siddiqui | G06T 7/579 |
| 2020/0043348 A1* | 2/2020 | Ghosh | G08G 5/0013 |
| 2020/0265247 A1* | 8/2020 | Musk | G06V 10/803 |
| 2020/0294274 A1* | 9/2020 | Chavez | G06T 19/006 |
| 2020/0324898 A1* | 10/2020 | Youmans | G06V 20/176 |
| 2020/0329104 A1* | 10/2020 | Narayanasamy | H04L 67/125 |
| 2020/0388169 A1* | 12/2020 | Barr | G08G 5/0021 |
| 2020/0401617 A1* | 12/2020 | Spiegel | G06F 16/587 |
| 2021/0019903 A1* | 1/2021 | Gornik | G01C 5/00 |
| 2021/0061465 A1* | 3/2021 | Kaneda | G06T 7/50 |
| 2021/0099969 A1 | 4/2021 | Poscher et al. | |
| 2021/0112311 A1* | 4/2021 | Wilczynski | H04N 21/84 |
| 2021/0112312 A1* | 4/2021 | Wilczynski | G06F 16/44 |
| 2021/0209331 A1* | 7/2021 | Grant | G08G 5/0086 |
| 2021/0240206 A1* | 8/2021 | Michini | G01C 15/02 |
| 2021/0263166 A1* | 8/2021 | Zheng | G08G 1/0116 |
| 2021/0302195 A1* | 9/2021 | Miura | H04W 4/40 |
| 2021/0374836 A1* | 12/2021 | Bronicki | G06Q 30/0623 |
| 2022/0291686 A1* | 9/2022 | Yoshimura | G05D 1/0221 |
| 2022/0301192 A1* | 9/2022 | Boardman | G06T 7/579 |
| 2022/0343773 A1* | 10/2022 | Ali | G08G 5/30 |
| 2023/0067774 A1* | 3/2023 | Nishimoto | G01S 5/0221 |
| 2023/0188941 A1* | 6/2023 | Palop | H04W 4/021 455/456.1 |
| 2023/0408288 A1* | 12/2023 | White | G01C 21/3807 |
| 2024/0020968 A1* | 1/2024 | Haskin | G06F 16/29 |
| 2024/0092485 A1 | 3/2024 | Youmans et al. | |

OTHER PUBLICATIONS

Non-Final Office Action mailed Mar. 29, 2022, in U.S. Appl. No. 16/845,667 (23 pages).

Final Office Action mailed Sep. 27, 2022, in U.S. Appl. No. 16/845,667 (43 pages).

(56) References Cited

OTHER PUBLICATIONS

Notice of Allowance and Fees Due and Interview Summary mailed Sep. 1, 2023, in U.S. Appl. No. 16/845,667 (12 pages).

* cited by examiner

CLOUD AND HYBRID-CLOUD FLIGHT VEHICLE AND ROBOTIC CONTROL SYSTEM AI AND ML ENABLED CLOUD-BASED SOFTWARE AND DATA SYSTEM METHOD FOR THE OPTIMIZATION AND DISTRIBUTION OF FLIGHT CONTROL AND ROBOTIC SYSTEM SOLUTIONS AND CAPABILITIES

CROSS-REFERENCE TO RELATED APPLICATION

This application claims priority from U.S. Provisional Application No. 63/196,689 filed Jun. 4, 2021, which is expressly incorporated herein in its entirety.

FIELD OF THE INVENTION

The present invention relates to a methodology to develop dynamic control systems for unmanned aerial vehicles (UAVs), ground-based drones/robotics, or otherwise any other robotic system. More specifically, developing, distributing, and subsequently refining control systems via real-time updates, may be useful to provide real-time updates to the UAV and/or ground-based robotic system to be able to safely account for external adverse conditions, such as weather, wind gusts, and the like.

BACKGROUND OF THE INVENTION

The present invention relates to systems and methods to develop, refine, and distribute dynamic control operations for unmanned aerial vehicles (UAVs), ground-based drones/robotics, or otherwise any other robotic system. More specifically, a system wherein flight vehicle and other robotic system controls equations are stored in a cloud-based data system wherein control systems are sent, via the cloud and over the internet or otherwise, to flight vehicles and robotic systems. Wherein further, data recorded during operations of the robotic systems is recorded and sent via the internet or otherwise to the cloud data system with the control equations, wherein data from a flight vehicle or robotic system connected to said cloud is used to tune, optimize, or otherwise enhance control equations, control systems, constraint equations, or otherwise—where optimization or tuning happens on the cloud, and updated and enhanced control equations and control systems are sent back to the flight vehicles or robotic systems on such a network. With such systems and methods, data about a flight/travel area may also be stored, distributed, and added to with data from robotic vehicles connected to such a network.

BRIEF SUMMARY OF THE INVENTION

The present invention concentrates on the optimization and distribution of flight control systems for unmanned aerial vehicles (UAVs), ground-based robotic systems, or any other robotic-based system (generically "drones"). The flight control system itself is the mathematical and software conduit between the movement of the physical parts of the UAV and/or robotic system, such as the motors, propellers, wheels, arms, legs, or otherwise, and the navigation software and/or system of the UAV and/or robotic system. More specifically, the flight control system itself takes inputs from the navigation system in the form of, for instance, GPS coordinates, waypoints, destination points, or otherwise, and converts those inputs into movement outputs, like motor thrusts, propeller shifts, wheel rotations and power, arm and leg pivots, and otherwise, such that the UAV system and/or robotic system will move towards the GPS coordinate and/or waypoint as specified by the navigation system. When using the term GPS (Global Positioning System), any satellite navigation system is meant, such as BeiDou, GLONASS, Galileo, or others, and the term GPS is not meant to be limited to a single satellite navigation system, and further encompasses navigation systems that do not utilize satellites. Generally speaking, flight, and otherwise robotic/drone, control systems today are hard-coded and centralized onto the specific UAV and/or robotic system on which they operate, through various hardware, software, and mathematical algorithms.

The present invention is a dynamic flight, and otherwise robotic, control system that is located on a cloud database server that receives inputs, in the form flight data, sensor data, GPS data, and otherwise, from unmanned aerial vehicles (UAV) and/or ground-based robotic systems, analyzes this data via machine-learning algorithms hosted in the cloud database server and optimizes any given control system based on this data, and then finally sends an updated, improved control system, in the form of a software update, back to the unmanned aerial vehicles (UAV) and/or ground-based robotic systems. The cadence of the transmission of the inputs from the unmanned aerial vehicles (UAV) and/or ground-based robotic system to the cloud database server, and the transmission of the control software update from the cloud database server to the unmanned aerial vehicles (UAV) and/or ground-based robotic system, can be real-time, or can follow a more standard cadence, such as hourly, daily, weekly, every 2 weeks, monthly, or otherwise.

The cloud database server will house three primary categories of data: 1) Flight, and otherwise robotic or ground-based transport, control systems. This category includes the mathematical and software control systems for a variety of unmanned aerial vehicles (UAVs), ground-based robotic system, and otherwise robotic systems, and a variety of robotic configurations. 2) Flight, and otherwise robotic or ground-based vehicles, use case, flight/travel logs and other sensor information data. This category includes log data of the specific flight/travel path or robotic ground-based path (references to a "flight path" herein are interchangeable with "travel path", unless otherwise contradicted by context), including GPS-coordinates, waypoints, exact flight paths, use case and mission data, and sensor information, including actual GPS flight path coordinates, inertial unit measurement (IMU) data, motor thrust information, etc. And finally, 3) machine-learning algorithms. This category includes a series of mathematical algorithms that are designed to leverage existing flight control systems, analyze the flight data, ground-based robotic systems, and optimize each UAV and/or otherwise robotic system based on the use case and mission profiles that that particular drone and/or robotic system conducts more often.

The present disclosure describes methods and system for controlling one or more drones. The system may comprise a server comprising a processor, memory accessible by the processor, and one or more communications modules. The server may be configured to control at least one drone by an exchange of signals between the server and the drone. The server may receive a drone signal from the drone. The drone signal may comprise on one or more signals detected by one or more sensors at the drone. The server may determine a state of the drone based on the drone sensor input(s). The server may calculate a predicted state of the drone at a predetermined time in the future based on the determined state of the drone. The predetermined time may be set to approximate a communications lag between the drone and the server. The server may generate a set of commands for instructing control of the drone based on the predicted future state of the drone and send the set of commands to the drone by a server signal.

The predetermined time at which the predicted future state of the drone is calculated may be set to account for the sequence of the exchange of signals. The sequence may comprise the following set of steps: The drone may send a drone signal to the sever. The server may receive the drone signal and determine the state of the drone. The sever may calculate the predicted future state of the drone and generate the set of commands. The server may then send the server signal to the drone. The drone may receive the server signal, decode the set of commands, and effect the instructed control at or prior to the predetermined time in the future.

The server may further be configured to record the state of the drone and the travel path of the drone as functions of time. The server may be further configured to analyze at least one of: a state of the drone over time; a command sent to the drone; and a travel path of the drone. The server may be further configured to update machine learning algorithms for improving future drone controls by using the aforementioned analysis. The server may be further configured to communicate at least one of the following to a user's device: a current state of the drone; a command sent to the drone; and a travel path of the drone. The system may further comprise one or more drones. These one or more drones may be configured to send drone signals to the server, to receive server signals from the server, and to effect an instructed control from the set of commands generated by the server.

The disclosure describes a system for updating and optimizing control of one or more drones over time. The system comprises a server with a processor, memory accessible by the processor, program instructions and data stored in the server memory, and one or more communications modules for sending and receiving signals. The server may update a control algorithm of at least one drone. The update involves the server receiving a drone signal from the drone. The drone signal may comprise travel telemetry data captured by one or more sensors at the drone. The server may determine a state of the drone based on information from the drone signal. The server may calculate updated model parameters for the control algorithm for the drone based on the travel telemetry and the state of the drone, wherein the updated model parameters are calculated to effect an increase in a control of the drone in relation to a predetermined performance metric. The server may send a server signal to the drone, the server signal comprising the updated model parameters.

The server may further iteratively repeat the process of: receiving a drone signal; determining a state of the drone; calculating updated model parameters; and sending a server signal to the drone with the updated model parameters. The server may generate updated model parameters based one or more pre-stored models comprising at least one of: support vector machines; neural networks; ensemble methods; clustering techniques; and dimension reducing methods. The drone control algorithm may comprise at least one of: open loop systems; closed-loop systems; linear systems; and non-linear systems. The drone control algorithms may comprise methods for numerically solving differential equations to calculate the drone's travel path. The system may further comprise at least one drone. The at least one drone may comprise one or more sensors for receiving data. The drone may also comprise a drone controller for controlling the drone and one or more communications modules for sending and receiving signals. The drone control may comprise a processor, memory accessible by the processor, and program instructions and data stored in the memory.

The disclosure describes a system for estimating a location for one or more drones. The system may comprise a server, which itself comprises a processor, memory accessible by the processor, program instructions and data stored in the server memory, and one or more communications modules for sending and receiving signals. The data stored in the memory may comprise a geolocation dataset. The geolocation dataset may comprise region data representing a region for a planned travel path of at least one drone. The geolocation dataset may comprise travel data representing a planned travel path of the drone through the region. The geolocation dataset may comprise object data representing recorded objects that correspond with real world objects along the planned travel path. The object data including geo-tagged metadata informing the locations of each recorded object along the planned travel path. The server may estimate a location of the at least one drone. The estimate may comprise the following steps. The server may receive a drone signal from the drone. The drone signal comprising data on one or more inputs received at one or more sensors of the drone. The server may compare information in the drone signal with the geolocation dataset stored in the memory of the server. The server may match information in the drone signal with one or more recorded objects in the geolocation dataset. The server may estimate a distance of the drone to the one or more matched objects. The server may estimate a geographical location of the drone based the estimated distance of the drone from the one or more matched objects and the geo-tagged metadata of the one or more matched objects.

The server may further be configured to estimate a geographical location of the drone by triangulating a relative position of the drone relative to matched objects and comparing the triangulated position with data in the geolocation dataset that is representative of a 3D environment of the planned region. The server may be further configured to iteratively repeat a process of estimating an enhanced geographical location of the drone by identifying region data corresponding with a first estimated geographical location of the drone, identifying a number of selected features of recorded objects that are associated with the identified region, comparing information in the drone signal with the selected features of the recorded objects, matching information in the drone signal with one or more recorded objects based on the comparison with the selected features, estimating a distance of the drone to the one or more matched objects, and estimating an enhanced geographical location of the drone based on the estimated distance of the drone from the one or more matched objects and the geo-tagged metadata of the one or more matched objects. The server may be configured to iteratively repeat the steps for estimating an enhanced geographical location of the drone, with each successive iteration using selected features of the recorded objects that are of increasing fidelity and detail for a 3D representation of the environment corresponding with the identified region data until an estimated geographical location of the drone is determined to be above a predetermined degree of precision. The server may be further configured to store information obtained from one or more drone signals in the server memory, analyze the stored information to update and improve a 3D representation of the planned region, and distribute the updated 3D representation to one or more additional drones.

The server may further be configured to determine a location of the drone. The determination may comprise at least one of the following steps. The server may calculate a current location based on a last known location and an inertial measurement of the drone. The server may match information from the drone signal to recorded objects in the geolocation dataset that correspond with real world objects along a planned travel path of the drone, and triangulate a position of the drone relative to the matched objects. The server may compare prior-calculated locations of the drone to yield an estimated current location of the drone. The server may compare one or more estimated locations of the drone with a GPS location. The server may also use a combination of one or more of the foregoing steps.

The system may further comprise at least one drone. The at least one drone may comprise one or more sensors for receiving data. The drone may comprise a drone controller for controlling the drone. The drone may comprise one or more communications modules for sending and receiving signals. The drone controller may comprise a processor, memory accessible by the processor, and program instructions and data stored in the memory. The drone may further comprise an image recognition and location module. The drone controller may be configured, in the event of an interruption in receiving a server signal in excess of a predetermined threshold time, to execute a drone control algorithm stored in the drone memory for guiding the drone through use of the image recognition and location module until communication with the geolocation signal is reestablished.

The disclosure describes a system for verifying the readiness of a drone to meet performance standards for safety. The system may comprise a server. The server may comprise a processor, memory accessible by the processor, program instructions and data stored in the server memory, and one or more communications modules for sending and receiving signals. The server may verify a drone's meeting performance standards by the following steps. The server may send a server signal to the drone. The server signal may comprise an instructed test travel path for the drone to travel. The server may receive a drone signal from the drone. The drone signal may comprise data obtained from one or more sensors at the drone while the drone travelled the test travel path. A simulation of the drone travelling along the instructed test path may be generated based on data for the instructed test travel path stored at the server memory and drone performance characteristics calculated from the received drone signal, such that the simulation matches the real drone's performance capabilities and functionality. The server may compare performance information from the drone signal to performance information from the simulation of the drone travelling alone the test travel path. The server may calculate performance differences between the performance information from the drone and performance information from the simulation. The server may compare the calculated performance differences to one or more verification thresholds stored in the server memory. The server may determine that, if the calculated performance differences are within the one or more verification thresholds, that the drone meets performance standard requirements for safety. The server may determine that, if the calculated performance differences are outside the one or more verification thresholds, that the drone does not meet performance standard requirements for safety.

The server memory may store one or more simulations for a test travel path that comprises multiple verification thresholds along the test travel path. The server may be further to determine that, if the calculated performance differences are within a predetermined number of the verification thresholds, that the drone is fit for travel. The server may be configured to determine that, if the calculated performance differences are outside the predetermined number of the verification thresholds, that the drone is unfit for travel. The predetermined number of the verification thresholds may correspond with the total number of verification thresholds for the test travel path.

The server may be further configured to identify verification metrics by a selected simulation test travel path. The server may identify performance metrics in the performance information from the drone signal after travelling the instructed test travel path. The server may compare performance metrics in the drone signal to the verification metrics required by the selected simulation test travel path. The server may determine that, if the drone signal comprises performance metrics corresponding with all verification metrics required by the selected simulation test travel path, the instructed test travel path was sufficient for verifying drone readiness. The server may determine that, if the drone signal lacks performance metrics for any verification metric required by the selected simulation test travel path, the instructed test travel path was insufficient for verifying drone readiness.

The server may further be configured such that when a determination is made that the instructed test travel path was insufficient for verifying readiness of the drone, the server sends a second server signal to the drone. The second server signal may comprise a second instructed test travel path for the drone to travel, the second instructed test travel path differing from the prior instructed test travel path. The server may use information from the drone signal to generate a complex travel path simulation for performing simulated tests of the drone's capability to perform a predetermined mission. The server may further be configured to communicate with a user device to convey determination results of the drone's readiness.

The system may further comprise at least one drone. The drone may comprise one or more sensors for receiving data. The drone may comprise a drone controller for controlling the drone. The drone may comprise one or more communications modules for sending and receiving signals. The drone controller may comprise a processor, memory accessible by the processor, and program instructions and data stored in the memory. The drone controller may be configured to perform the following steps. The drone controller may receive a server signal from the server. The server signal may comprise an instructed test travel path for the drone to travel. The drone controller may control the drone to travel a test travel path instructed by the server signal. The drone controller may collect data through the one or more sensors while travelling the test travel path. The drone controller may send a drone signal to the server. The drone signal may comprise the data obtained while travelling the test travel path.

A BRIEF DESCRIPTION OF THE DRAWINGS

FIG. 1 shows an architecture diagram for a system where a data from flight vehicles is stored, control algorithms and control system constraint equations are stored, multiple drones or robotic systems are connected and able to upload flight performance data, telemetry data and meta data, and machine learning, artificial intelligence, and statistical systems are able to optimize parameters within the equations and algorithms stored in the database system, and updated parameters and control equations can be sent out to the connected drones or robotic systems resulting in improved performance of the drones or robotic systems as described with the present invention. Additional control system related equations may be added to the database system where data from vehicle operations is used to tune and refine control system parameters and equations, and include and tune and incorporate constraint equations or other algorithms in order to enhance control equations and capabilities and/or performance of vehicles, drones, and robotics connected to such a system. In such a case, constraint equations may keep a vehicle with or outside of a certain area, or keep a vehicle within or outside of a certain state, including angle relative to a ground, and/or power use or otherwise. Within such a system, routes of a vehicle, which may be a flight route of a vehicle, may be analyzed and optimized, in such a manner that a vehicle may most precisely follow a desired route, by taking operations data of a vehicle, including the realized path of the vehicle versus the achieved vehicle, and optimization of control system equations and/or parameters and/or navigation routes input to vehicle control systems are performed to adjust the realized route to most closely match a desired route.

Additionally, the route input to the control system based on the desired route may be optimized to most safely or with the least amount of power, or based on other metrics, accomplish the input route. Additionally, other capabilities may be added to the data system of the present invention, wherein new capabilities can be delivered to one or more drones on the system, wherein software to allow cameras on the drone to have object recognition are added, and the software is delivered, uploaded, sent, to one or more vehicles, so that the vehicles have new capabilities, in this case object recognition with the cameras already on the drone. Additionally, data from the operations of running that object recognition software is returned to the database system, and optimization and enhancement algorithms and/or processes take place, and updates and enhancements to the object recognition system may be delivered to the vehicle Other capabilities may also be added to drones connected to such a system, and distributed to the vehicles connected to such a system, and also optimized by recording data from the operations of the vehicles and using the data in machine learning and other optimization tactics to optimize parameters, equations, and/or functionality of such added capabilities. As an example, operations software to make an existing radio system that can dynamically adjust to data through-put based on multiple factors is input via the Inputs, and distributed through the system to vehicles in the network, and data from the use of the communications system is returned to the database system, and optimization occurs to enhance the functionality of the communications system. In such an embodiment, such a capability may be delivered to all or some vehicles on such a platform. Various different new capabilities and features may be distributed to drones and robotic systems connected to a cloud data system as an embodiment of the present invention.

An embodiment of the present invention may also include a verification system that back tests any new capabilities using data stored within the system, it may test features, and/or control systems on prior flight data in the system to ensure reliability, prior to any updates or new products being pushed to any vehicles.

Figure 2:
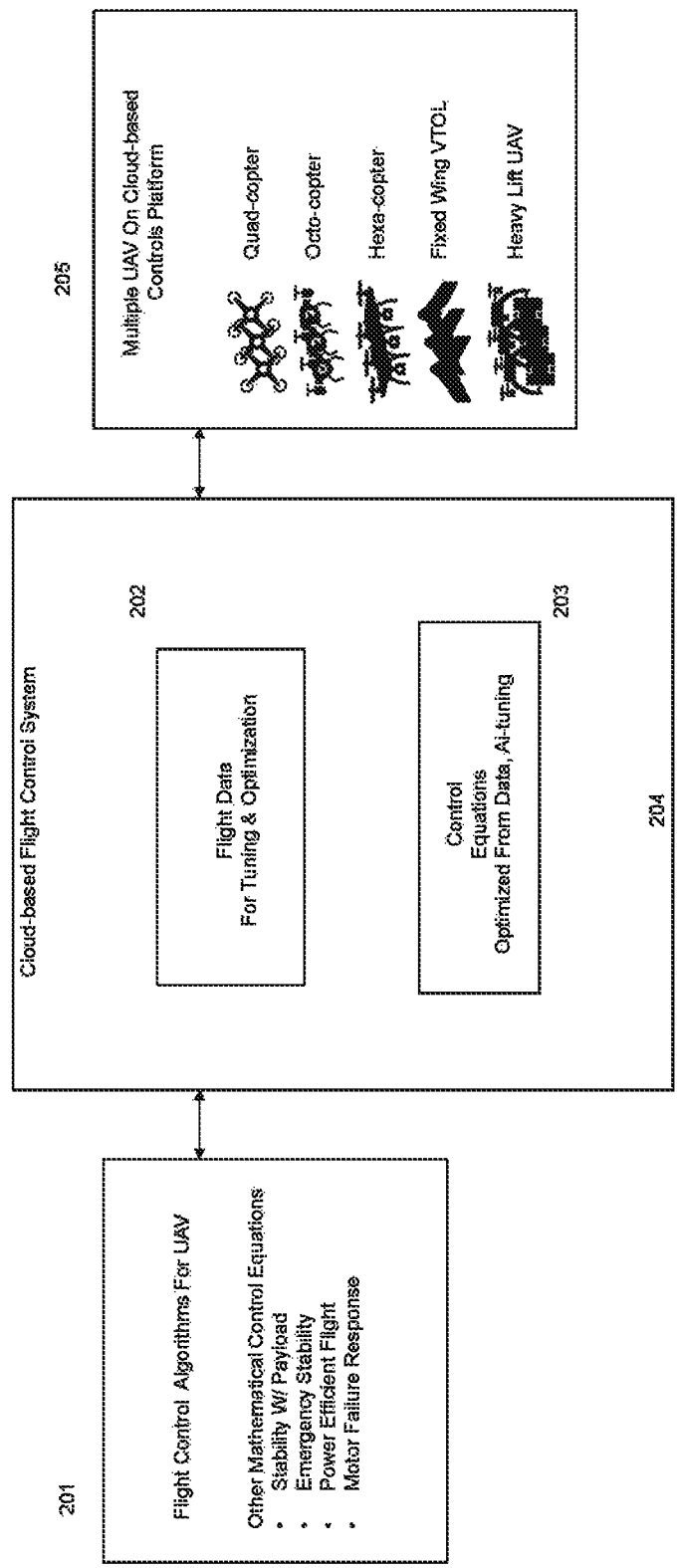

FIG. 2 shows the proposed invention at a higher scale, focusing on flight vehicles, wherein control systems that may input to the cloud are shown in 201 and the cloud system which collects and stores flight data and other data is shown in 202 and control equations and constraint functions that are optimized are shown by 203; many drones, including many different types and categories and sub-categories are shown in 204. Additional and other capabilities encoded up in software and potentially including mathematical equations may be shown in 201, and other capabilities to be tuned and sent to flight vehicles as per the present invention would be a cloud-image analogous to 203.

Figure 3:
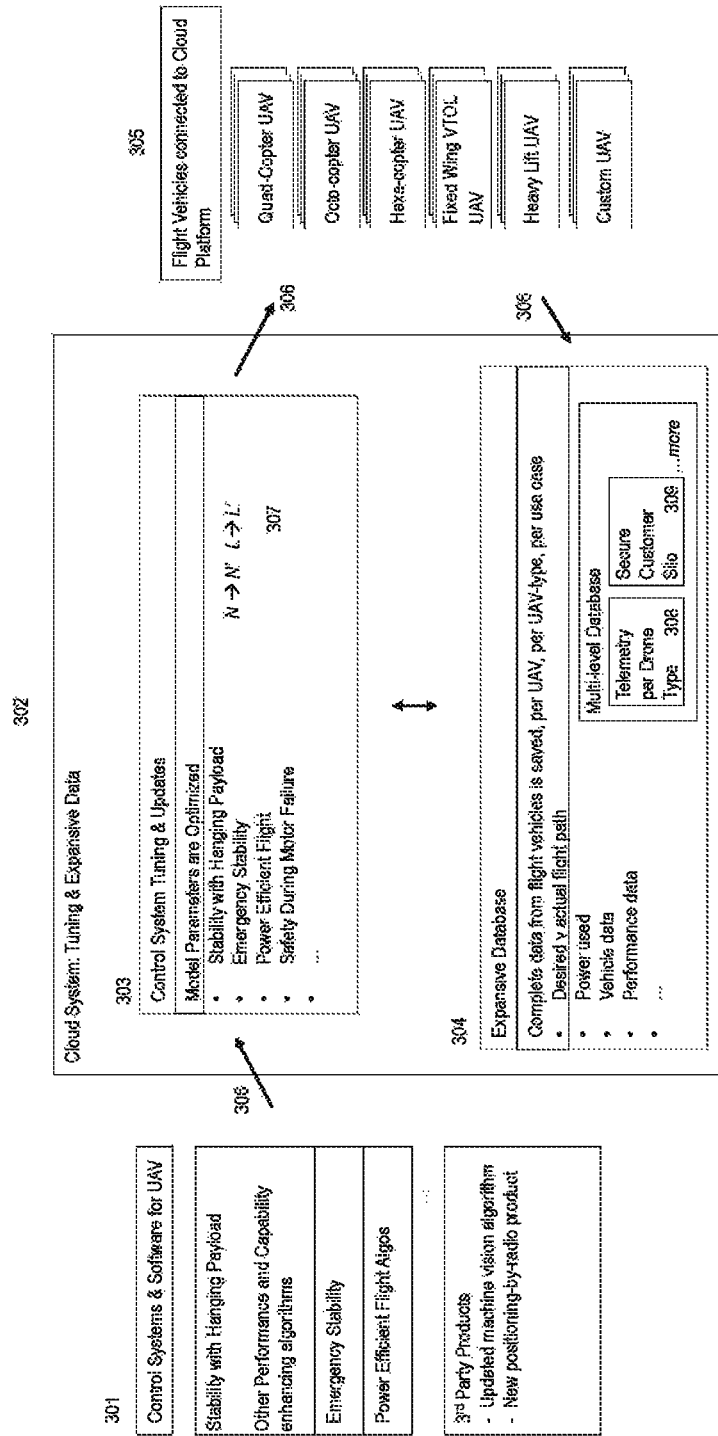

FIG. 3 shows a more detailed explanation of FIG. 2 wherein multiple capabilities enabled by control systems and other technology are shown in 301, including 3rd party technologies that may be distributed to drones or robots through the proposed invention; 302 shows an overall cloud system, containing and/or including 303 controls systems that enable enhancements and capabilities and constraint equations, and 304 an expansive and large set of data from operations of flight vehicles; 305 shows many flight vehicles of different type being connected to such a cloud system, where they receive updates and new capabilities as per the present invention and send data from sensors, cameras, flight, location, etc., back to the cloud data storage system. In the system data and results of optimized systems are sent between connected drones and robotic systems, 306; parameters are optimized and newly calculated optimal parameters 307 are tested and then sent to connected drones and robotic systems.

An embodiment of the present invention may use categories and subcategories of data in the system for different types of flight vehicles and cross-platform and vehicle type applicable models and enhancements may be used with control systems, constraint functions, new products, new capabilities and 3rd party products for use with drones through the proposed invention; models, updated parameters, and other updates may be optimized specifically per-UAV type, and per-mission type.

Figure 4:
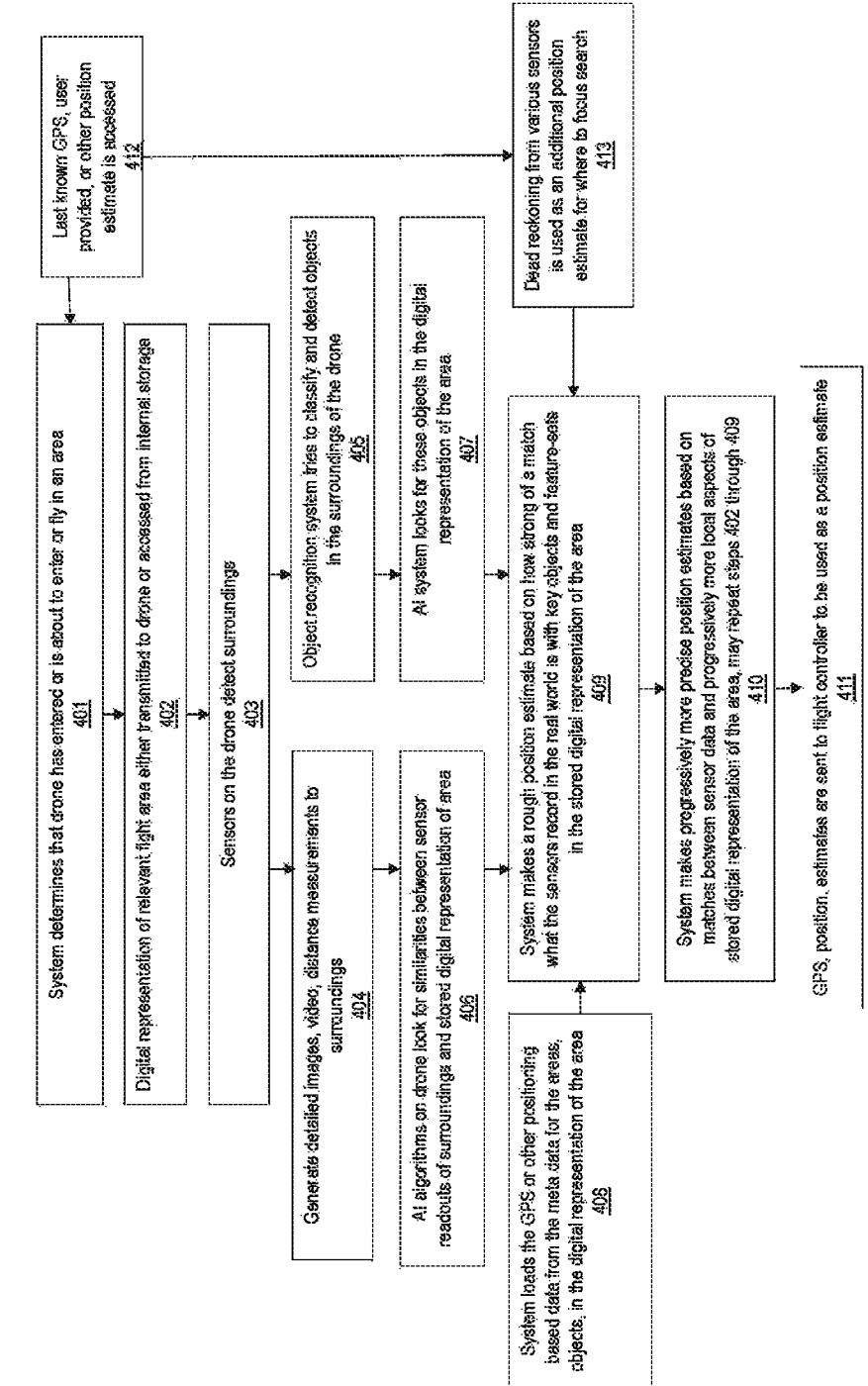

FIG. 4 shows a schematic of how a drone or robotic system of the present invention uses stored spatial systems, onboard sensors, and machine learning, artificial intelligence systems to estimate a position without GPS. Such a system as in the proposed invention works by having a spatial map of a flight area stored on board, and using cameras or sensors on the vehicle to record data from the surroundings of the drone, and comparing what the sensors detect with what exists in the stored spatial map, determining if and where what the drone senses in the real world is in the stored spatial map, and using the combinations of the meta data including geo-tagged GPS coordinates of the objects in the stored spatial in order to estimate an expected position of the drone or robotic system. Such a method may employ feature sets of objects for reduced data, visual data, point cloud data, and may entail first examining at a high level the location of the drone, then once a rough position is detected, examining more detailed data, then once a more refined position is estimated, using again, a more detailed calculation of the position. For example, a drone may have a starting GPS point before a GPS signal is lost, a drone may then examine its surroundings and the stored spatial map to infer if it is in a certain valley, and once it detects that it is in a valley, it may look for a certain set of trees and rocks, and once it identifies its position relative to this set of trees and rocks, it may then use a specific exact rock with a specific exact high detailed model of the rock, and position itself relative to this exact known position, as such a rock, or other element, has specific geotagged meta data within the stored spatial system. Different spatial maps of different levels of fidelity may be sent to a drone or robotic system through a wireless network during different steps in such a localization or position estimating process.

Figure 5:
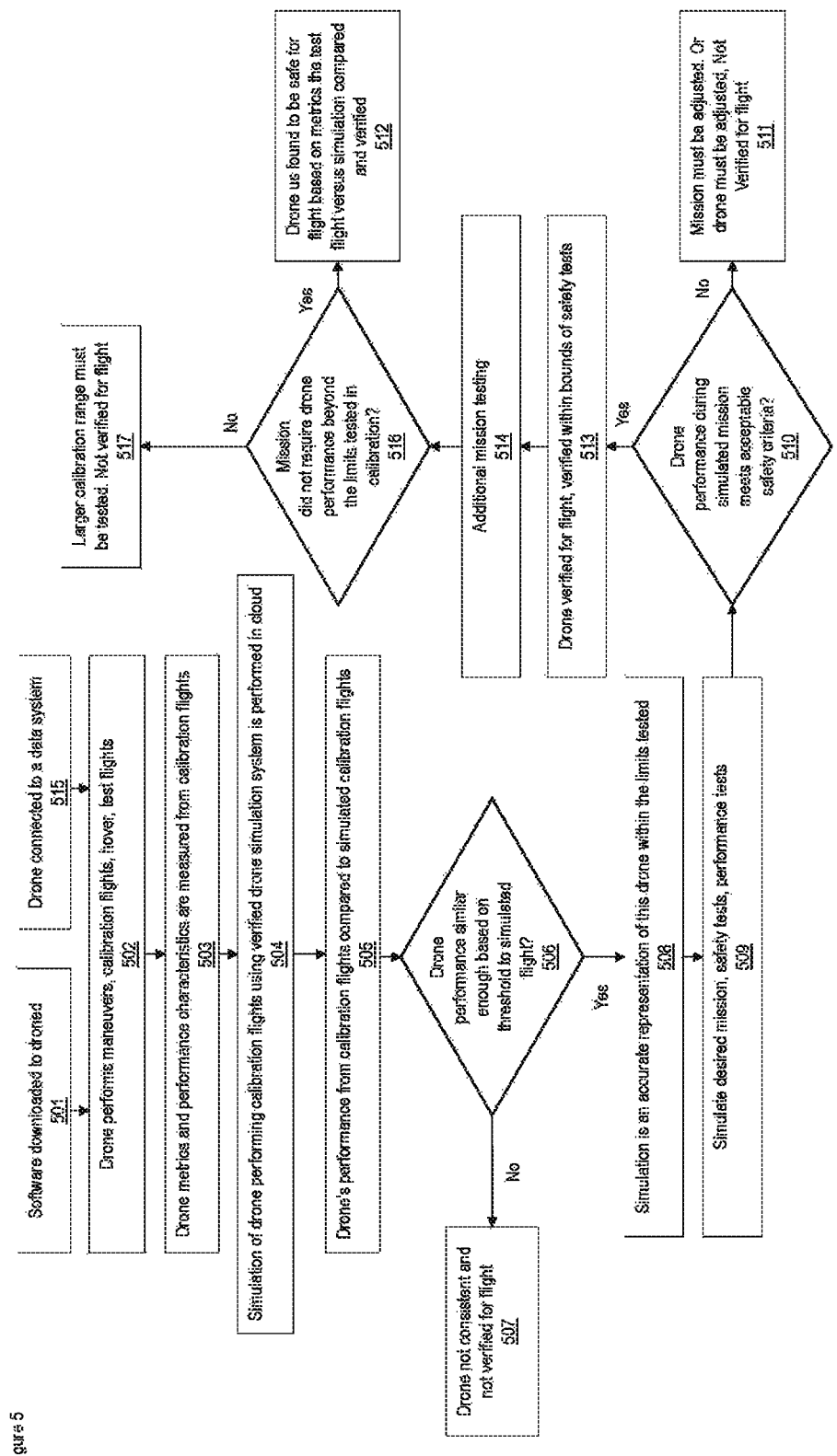

FIG. 5 shows a schematic of a drone being tested and verified as safe. Software may be downloaded to the drone. The drone performs calibration flights, as directed by the software download. The same flight paths are modeled in a cloud environment using the same metrics and performance characteristics of the drone, and the simulated flight is compared to the actual calibration flight. If the calibration flight and the simulated flight are highly similar to a degree beyond a determined threshold, the drone is qualified as flight safe. Simulations may also be run of the drone performing complex and potentially dangerous flights. If the simulations perform well and safely and as expected, it is inferred that the drone is safe and performs as expected even for these more complex travel paths. Additional safety systems may also be added to the drone in and during such a process. In an example, a UAV may require a test or calibration flight, which itself may comprise various steps such as hovering, steep climbs, and sharp turns. The UAV's sensor data is downloaded to the server as a means of tracking the flight path. The server then simulates the UAV's test flight and compares the simulation with the actual test flight. If the two flight paths are similar to within a threshold, the simulation is considered an accurate representation of the drone. Once the simulation has been verified, then the server may simulate a desired mission for that drone. If the simulated mission meets acceptable safety criteria, then the drone may be released to perform the actual mission. The mission may not have required the drone to perform beyond the limits tested in calibration. If the mission requires such performance, then a larger calibration range must be tested and the UAV would not be verified for that particular flight.

Figure 6:
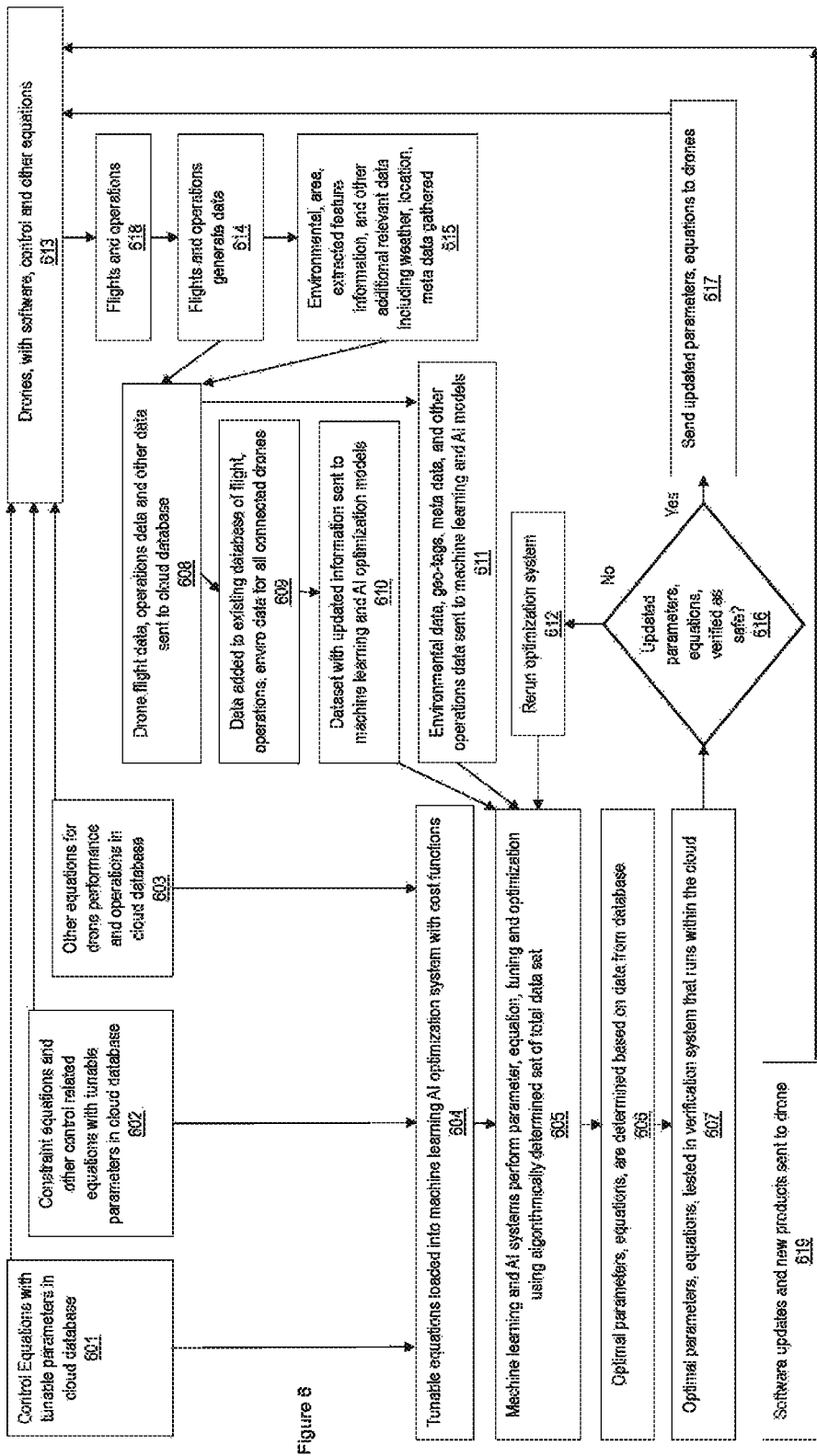

FIG. 6 shows a schematic of the present invention wherein an embodiment of the present invention where control equations and constraint equations are tuned and optimized using flight data from a drone. In such a system control algorithms and other equations are stored in a cloud database system, drone flight data is loaded into the cloud data system, tuning algorithms optimize parameters within the equations based on cost functions or other desired metrics, newly updated parameters are estimated and sent to the drones to update the parameters in the control systems of the drones, and the drones therefore have higher performance due to the optimized parameters and enhanced equations. Such a system may be deployed with many drones or robotic systems at one time, and other software programs may be sent to such drones over the proposed system.

Figure 7:
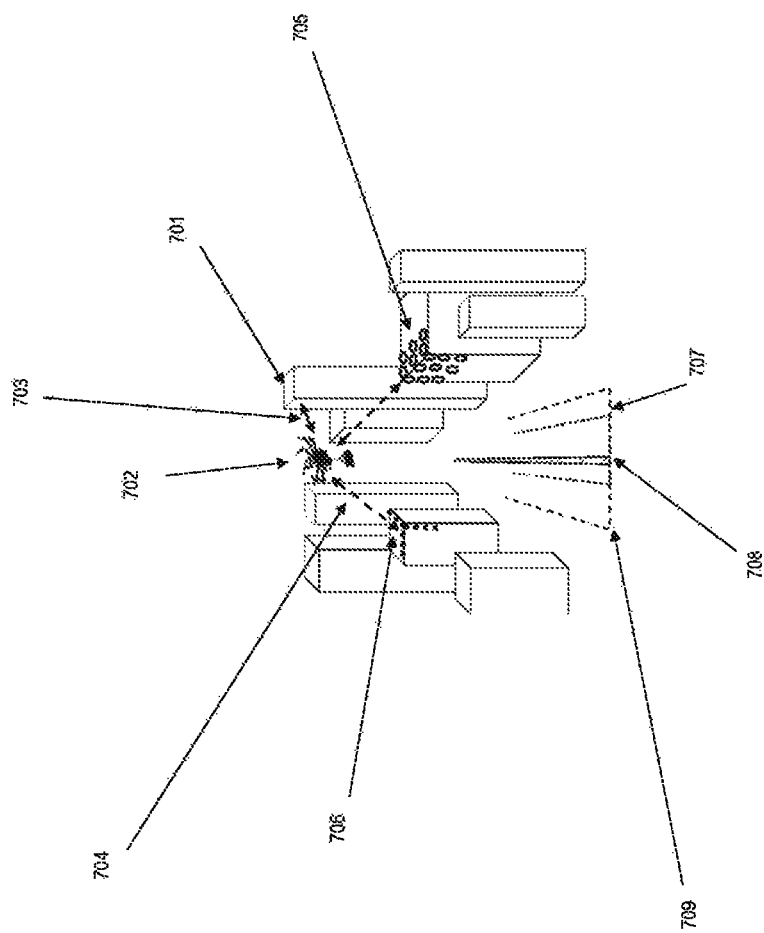

FIG. 7 shows an example of a spatial map or spatial system or digital twin or digital representation of a flight or operations area that may be used by the present invention for a drone or robotic system to estimate its position or location without GPS. A spatial area map 701 is used and may be loaded onto or accessible via data connection by a drone 702 that uses onboard sensors to detect objects and perform object recognition 703 of objects in the real world, uses onboard sensors to examine feature sets 704 of elements of its surroundings, wherein feature sets may include various representations of objects with visual data systems, shapes, point clouds or otherwise, 705 and 706, and use the methods of the present invention, and as shown in an example in FIG. 4, estimate its position or location.

DETAILED DESCRIPTION OF THE INVENTION

A method for flight vehicle control system optimization is presented wherein a plurality of flight vehicles are connected to a data base wherein optimizations of parameters or models, including, defined by, or within, mathematical equations, are performed, and updated parameters and/or models are sent to vehicles connected to this database.

A computer device is described that is on a flight vehicle. The computer device has programmed functionality to connect to a database where the database optimizes functions, mathematical equations and/or parameters that are part of mathematical equations, wherein updates or new models are sent to the computer device on the flight vehicle, where the flight vehicle sends data to the database A control system is presented that sits in a database that may be a cloud, hybrid cloud or local database, where the control system includes equations for vehicle control, safety constraints, and/or other constraints, and the control system is connected to a database where amounts of data in the database are used within the control system, and models, parameters, equations, are optimized, solved, constrained, tuned or enhanced by the control system utilizing the data from a plurality of flight vehicles connected to the system A robotics control system method or framework or system design is presented where a plurality of robotic systems are connected to a database where data from the operations of the robotic system is sent to the database and the database includes control systems, control equations, control methodologies, wherein different control systems may apply specifically to certain robotic systems connected to the database, wherein each control system can benefit from the data from all robotic systems connected to the database, wherein tuning and optimization of control systems occurs in the database, and enhanced control systems that are enhanced, tuned, or otherwise improved based on the data, are sent to the robotics connected to the database. The database may be a cloud database or a hybrid cloud database.

Data may be sent at designated intervals. Updates or optimized parameters or functions may be sent to the flight vehicle or robotic system at designated intervals. The software and data transmissions that are passed back and forth from the unmanned aerial vehicles (UAV) and/or ground-based robotic systems and the cloud database server described above are transmitted via the internet, and/or cellular data, such as 4G or 5G LTE. The software solution is developed to be hardware-agnostic and as widely applicable to as many unmanned aerial vehicles (UAV) and/or ground-based robotic systems as possible.

In relation to controls and navigation, a system for autonomous robotic systems is presented where equations describing robotic control and navigation are stored within a database, and a plurality of robotic systems are connected to the database, and operational and other data about each robotic system is sent to the database, and machine learning or artificial intelligence or other equations or methods are used to optimize vehicle control and/or navigation, where updates or updated equations or models or parameters are sent to the robots/drones, to enhance controls to enhance navigation, to make a vehicle follow a designated navigation route more precisely, to make a planned navigation route more precise, and/or to keep a robotic system on, aligned with, or following a navigation route. Robotic systems on such a platform or connected to such a database or connected to such a network may be flight vehicles.

In relation to a system for overall AI, controls, navigation, and smart multi-vehicle interaction, a system for autonomous robotic systems is presented where equations and/or methods and/or algorithms describing or relating to or informing robotic control and/or navigation and/or artificial intelligence and/or multi-vehicle interactions and/or other autonomous vehicle behavior and/or artificial intelligence are stored in a database which may be a cloud, where robotic systems are connected to the database, and robotic systems connected to the database send their performance and/or operational data to the database, and equations, methods, and/or systems are tuned, refined, optimized or updated using the data sent to the database, and the updates, optimized parameters, new equations, or other enhancements, are sent to the robotic systems on the network.

Flights logs, flight control systems, and other data are stored within a database. A plurality of robotic systems is connected to the database, and operational and other data about each robotic system is sent to the database. Machine learning or artificial intelligence or other equations or methods are used to optimize vehicle control and/or navigation, where updates or updated equations or models or parameters are sent to the robots, to enhance controls to enhance navigation, to make a vehicle follow a designated navigation route more precisely, to make a planned navigation route more precise, and/or to keep a robotic system on, aligned with, or following a navigation route.

A cloud based robotic control system platform is described where control equations and equations describing dynamics of robotic systems are stored in a database, and data from robotic systems is sent to the database from robotic systems on the network, and the control equations are tuned and optimized using this data, and refined, completed, enhanced or otherwise control systems and/or equations and/or parameters are sent to the robotic systems on the network.

A database may be a cloud database or a hybrid cloud database.

Models may be stored on compute elements on the robotic systems.

Categories and subcategories of robotic systems may be created, where control models or other models or equations are applied, used, tuned or optimized specifically within or for certain subcategories.

Optimization and tuning may be performed within a category or subcategory, wherein high-level learnings may be used from the entire database, and these learnings may be refined or tightened or tuned for an individual sub-category or for multiple sub-categories.

FIG. 1 shows a schematic and process of an embodiment of the present invention, where a database system 104 houses control equations 105 and other algorithms and equations 106 for one or more drones or robotic systems 119, and stores data (e.g. flight telemetry) 107 from those drones or robotic systems 119 and performs optimization 108 of parameters, coefficients and models 109 which are tested 111 and sent 112 to the drones and robotic systems 119 to enable improved performance and new capabilities 120, 121, 122, 123, based on those updated or new parameters and equations 109, 112 used by the drones or robotic systems 119. Specifically, as an embodiment of the proposed invention, a data system which may be a cloud data system exists 104, and one or more drones or robotic systems 119 are connected via wireless data link or a digital connection 125 to the data system 104, and various control equations 105 and constraint and other control and performance related equations 106 and associated algorithms and models are stored in the data system 104, wherein connected drones and robotic systems generate data from operations 124 as well as other meta data, environmental data and system data 126 and this is sent to the database system and stored there 107 for use in various machine learning, artificial intelligence and statistical modeling and optimization systems 108, 110. Control equations 105 and constraint and other equations 106 are used with data stored in the system 107 and optimization occurs 108 using methods of the present invention to update parameters, coefficients, and models and equations that are then tested 111 and sent back to the drones and robotic systems 119 via a data link 125, so that the drones and robotic system 119 may realize the performance enhancements and increased or new capabilities from these optimized equations and parameters 108. Additionally, based on flight telemetry and other data from flight 107 stored in the data system 104, navigation, routing, and AI navigation and routing decision systems 110 can be run with results sent to connected systems 109, 119, in order to provide enhanced routing, flight, navigation, and other operations. Additionally, software programs and algorithms 101, communications optimizations 102, and object recognition software 103, or others that provide new capabilities and may be created, sent to and stored in the database system 104, and may be delivered to the connected drones and robotic systems 119, in order to provide them with new or improved capabilities 121, enhanced communications 122, and object recognition 123 or other enhancements; such systems may use existing hardware on connected drones or robotic systems 119 or require the addition of additional hardware or sensors. Examples of new capabilities that can be created and deployed to connected drones and robotic systems include new or additional capability enabled by software 101 that can be run on a drone or robotic system 121, advanced radio controls 102 where by uploading radio-communications software, the radio-communications system can perform better 122 by using optimized algorithms to increase and decrease data rates based on signal strength and thus transfer more data more reliably. An example of a new or improved capability for such a drone or robotic system that was enabled on the drone or robotic system 119 via a software upload or update via the data system 104 of the present invention are new or improved object recognition systems 103, where new object recognition algorithms 103 can be deployed through an embodiment of the present invention, through the data system 104, onto one or more connected drones or robotic systems 119, and provide increased or new object detection or recognition systems 123 onto such connected drones or robotic systems. For example, algorithms and software that enable cameras to have object recognition capabilities 103 may be uploaded to the database system 104, and sent out via a data connection 125 to connected systems 119, and wherein these systems had previously cameras used for taking pictures, the use of an embodiment of the present invention may then enable the connected systems' cameras to then perform object recognition 123, for example, on the drone itself or by sending data back to the database system 104. Another example of new or additional capabilities 101 include third party products, services and other new software. Additionally, as in the present invention data from telemetry 107, drone operations 124, and other data 126 is shared with the data storage system 104 and used in optimization 108. Such methodology may be deployed to enhance, optimize, improve any such added other capabilities, wherein data from operations 124 and performance of an object recognition system 117 is sent to the cloud system 104 and optimization of the parameters, coefficients and models 118 of and relating to such a system may be performed. Updates, parameters, coefficients and models may be sent back to the drone systems 119 to improve, over time, the performance of added capabilities 121, such as enhanced communications 122 or object recognition software 123. Such iterative processes as data being recorded by connected systems 119 and shared with the data system 124, 125, 126, 115, 117, 104, and optimization occurring 108, 116, 118, and updated to parameters, coefficients, models, verified, 111, and sent back to the connected systems 119, can be iterated to continuously improve over time, and to let any of the connected drones and robotic systems, or all of them, improve and have new and better performance. Such a system, as it allows drones and robotic systems to record and store how they perform, what they do, what they see, and other immediate and meta data, and to learn and optimize from such data over time and implement the learnings, may be considered giving drones and robotic systems memory, the ability to learn over time, and the ability to share memory, learning, optimization, and awareness, as well as spatial knowledge of flight areas, over time and across connected systems. Various emergency maneuver, enhanced safety systems, stability with motor failures, emergency landing procedures, predictive maintenance and health safety checks, and pre-flight and during flight safety checks with go and no-go decisions may be included in such additional drone and robotic system capabilities 101.

FIG. 2 shows a breakout of the architecture of the system, where various control system and other performance enhancing algorithms 201 are uploaded to the data system 204 which may be a cloud data system, and using data stored 202 in the cloud system 204 from the connected drones and robotic systems 205, optimization occurs 203, with results sent back to connected drones and robotic systems 205; it is shown that many different drones and flight vehicles, of different shapes, and types, 205 may be connected to the cloud data system 204 of the present invention, wherein the set of different types and configurations of vehicles that are connected 205 can share different pieces of their learnings and shared memory 202 where certain learnings 203 apply to different sets and subsets of the connected systems, drones, or robots 205.

FIG. 3 shows a set of software enabled systems and product 301 including control systems, other equations and other performance increasing capabilities, as well as third party products and services being sent to such a cloud database system 302 of the present invention, and shows an expansive database with data for all connected systems/drones 308 and silo-ed data for specific customer and connected system groups 309 in the data storage system of an embodiment of the proposed invention. Algorithms and equations, models, and code 303 may operate drones and robotic systems 305. These algorithms, equations, models, and code 303 may be optimized through the present invention within the cloud system 302. An example of parameters and coefficients within models, algorithms, equations and code being updated 307, wherein such updated values are sent by a communications system 306 to connected drone systems 305. FIG. 2 shows the connections 306 between various models, algorithms, equations and code 301 uploaded to the cloud data system 302 and the connections 306 going from the cloud data system 302 to the connected drones and robotic systems 305. It is evident that many different numbers of many different vehicle sizes, types, configurations and otherwise robotic systems may be connected drones and robotic systems of the present invention.

FIG. 4 shows a schematic of an embodiment of the present invention ascertaining and estimating the position of a drone to determine its position, location, without GPS. As shown in FIG. 1 and in FIG. 6 environmental data 126 of drone operations including geo-tagged, feature set, visual, and distance based area measurements are sent to database systems 104, and stored in such systems 107, and used in embodiments of the present invention, at, for instance, 108, 110, 111, 109 or in FIG. 6 (see below). Such components of the present invention support processes, steps, techniques, and unique methods and systems of the present invention, with an example of such an embodiment in FIG. 4. A drone may have an initial position estimate or a starting position estimate 412. The drone may determine that it is about to or has entered a flight region, and access a digital representation of the region 402 that is stored locally or connected via a data network system 126, and uses sensors on the drone to detect information about the surroundings of the drone 403, such that algorithms and systems on the drone or in a connected cloud system may generate detailed images, video, distance measurements to elements of the surroundings of the drone 404, and also or instead may detect objects within the surroundings of the drone 405, and with such information, may use algorithms, machine learning, AI systems, to look for similarities between the sensor readouts and the digital representation of the area 406, and also, or instead, may look for objects detected, classified, recognized by the drone's sensors within the digital representation of the area 407 and using such determinations of similarity of sensor readouts and detected objects with elements, items, areas of the digital representation of the area, makes an estimation of the position or location of the drone, based on how strong of a match what the sensors record in the real world is with key objects and feature-sets in the stored digital representation of the area 409. In embodiments of the present invention, such a system loads the GPS or other positioning based data from the meta data for the areas, objects, in the digital representation of the area 408, and may use different algorithms to estimate an expected location, position, given the strength of similarity between the recognized objects and their geo-data. Additionally, in embodiments of the present invention, the system may make progressively more precise position estimates based on matches between sensor data and progressively more local aspects of stored digital representation of the area 410, wherein repeating the process of comparing sensor readout data, including feature-sets, point clouds, information about elements in the surrounding and or detected objects, with the digital representation of the area, steps 402 through 409, allows for increased precision of position, location estimate, and allows for optimal use of memory, data storage, and fidelity. Digital representations of flight areas 402 may load or be used with different levels of detail, granularity, pixels per area, otherwise, based on how zoomed in, local, the process may be, or how many iterations of steps 402 through 409 may have occurred. As GPS estimates reach a certain level of confidence, or continuously based on running estimates regardless of level of confidence, position, location estimates are delivered to a flight controller or control system or computer element on a drone or robotic system 411. Additionally, within the present system of the present invention, dead reckoning from various sensors may be used as an additional position estimate for where to focus search between sensor readouts and digital representation of area 413. One example would be the use of inertial measurement units, which can provide the known velocity and acceleration of a drone as a function of time. The location may be calculated from the last known position along with the inertial measurements. Additionally, as described in the present invention, various methods and systems may be used to reduce variance and estimation error of an iteration of such a system, based on a previous iteration. For example, a Bayesian technique may be used, also as described in the present invention, where an iteration may inform a prior for a subsequent iteration, and data and estimates inferred, detected, and predicted during an iteration may be used along with a prior to create a posterior distribution for an estimate, which may be a location estimate or a position estimate, for the output of this resulting subsequent iteration. Such tactics may be deployed within and over iterations of various steps, including object recognition 407 and feature set examination 406. In an example of the present invention as presented in FIG. 4, such a system may be deployed on a drone or flight vehicle, or any robotic system, car manufacturing stationary robot, or other system that functions in an area or environment, and may interact with an environment such that a change in operations or maneuvering or performance may occur based on environmental factors or factors that exist or change in an environment, or where a position or location of a system or robotic system is needed, either relative or absolute.

FIG. 5 shows an embodiment of the present invention wherein a drone, or any robotic system, may be verified as functioning or behaving as expected, and may be verified as functioning as expected as to be within a set of metrics or safety standards as may be then approved as safe, functional in accordance with standard or metrics, and approved or labeled as or considered safe for operations in accordance with and with approval of such standards. In such an example of the present invention, software is downloaded to a drone 501 or a drone is otherwise connected to a data system 515, a drone performs a maneuver or maneuvers which may include calibration flights, calibration hover, and test flights 502, and drone metrics and performance characteristics are detected, measured 503, from such maneuvers 502, and the metrics 503 are used in simulation of the drone performing the same maneuvers, calibration flights 504 which may be executed in a cloud data and simulation system, and using such a simulation 504 and calibration flights as may be within 503, the drones performance from such calibration flights 503 is compared 505 to the actual performance of the drone during such maneuvers 503, using various mathematical, statistical, artificial intelligence and otherwise methods for comparison. It is determined if the drone's performance is similar enough, versus a threshold 506 to the simulated flight, if the simulation performance fails to meet a threshold 507 then the drone is found not consistent and is not verified for flight. If the flight does not align with the expectations, and it may be not functioning properly. If the comparison is found to be similar enough beyond a threshold, then the simulation of the drone is an accurate enough representation 508 to be used in further safety and functionality testing. In such a case, simulations are run of at least one of mission, missions, safety tests, or performance tests 509, and the results of the simulations, and the performance of the drone in the simulations, is examined to meet acceptable safety criteria, and performance and functionality levels that show adequate safety 510. If the drone is found to be either not verified for flight 511 or verified as safe for flight 513, within the bounds and constraints of such a mission, safety tests, performance limits as tested within 509. In such a case, a drone may then be considered as safe and verified for flight. Additionally, a drone may be further tested for safety and be verified for additional missions 514 wherein additional missions and use cases may be tested in the simulation 509, and then an examination may be made where it is determined if the simulated mission did or did not require drone performance beyond the limits tested in calibration 516, and if it is found that performance was required for the mission beyond the calibration flights, it is determined that a larger calibration range must be tested and the drone is not verified for flight 517 or if the mission did not require performance beyond the limits tested in calibration, the drone is found to be safe for flight based on metrics the test flight versus simulation compared and verified 512. Such systems may be deployed to approve a drone for overall safety to meet regulatory requirements, such a system may be deployed to verify safety for a particular new mission set of use case of a drone or robotic system, such a system may be deployed prior to any of every single flight or mission of a drone, in such that given an input flight trajectory, such a trajectory is simulated in such a system, and safety is verified. Furthermore, such a system with such a simulation may include weather or wind gusts or other factors into the simulation, in order to verify safety for said trajectory or flight route. Additionally, such a system may be deployed wherein performance maneuvers, calibration flights, 502 include the first seconds of a take-off maneuver, and metrics for use in simulation are gathered from such maneuvers. Simulations of such a flight route as a desired or input route of the vehicle may be tested, and the system may be fully tested for safe completion of such a mission. A deployment of the present invention may include such tests with a drone that is loaded with a cargo payload, so that safety of a drone with any new, ad hoc, or otherwise payload, cargo or attached payload is tested, by the proposed system. While taking off, the performance metrics of the drone are measured, simulations are run as needed, and the drone, with the potentially different performance per payload or cargo, is tested for safety for any or the specific flight route planned. Such a system as in FIG. 5 may also be, or be part of, or be followed or used within such verification systems of parameters, coefficients, models, software, for drones and robotic systems, as described in safety and verification steps and systems such as FIG. 1, 111 (above) and FIG. 6, 607 (below). In any embodiments of the present invention, drones, robotic systems, and any such systems, may be deployed with the present invention.

FIG. 6 shows an example of a process flow, method, deployment of unique steps and algorithm to give drones memory and the ability to learn over time, and to share information, knowledge, spatial systems and awareness across multiple drone, robotic systems and platforms. Such a system allows drones or robotic systems 613 to load data into a cloud data system 104, where optimization algorithms run 108, and updated algorithms, equations, models, software 606 that dictates, directs, guides drone or robotic system performance, operations, decision-making, may be sent to some or all of the drones or of the robotic systems 119. Control Equations with tunable parameters in cloud database 601 may be uploaded to a drone's flight computer systems 613, constraint equations and other control related equations with tunable parameters in cloud database 602 may be uploaded to a drone's flight computer system 613, and other equations for drone performance and operations in cloud database 603 may be uploaded to a drone's flight computer systems 613. These control equations with tunable parameters 601, constraints 602, and other equations 603, may be sent for tuning by also including cost functions 604. These tunable parameters 601, 602, 603, along with cost functions 604, may be fed into a machine learning and artificial intelligence optimization system 605. Drone operations, flights, may occur 618, wherein data is generated from flights, operations 614, and data from a drone's surroundings and flight area may be generated 615, and data from operations 614 and environment, spatial systems, surroundings, and otherwise 615 is sent to a data storage system in a database or cloud data base 608. A spatial, environmental, area object feature set, geo-related, and other data from surroundings of flight or operational areas may be sent to specific environmental data systems which may include digital representations of flight areas, flight area maps, area of engagement maps 611. Data may be added to an existing database of flight, operations, and environmental data in such a system 609. Data sets and data sub-sets with updated information from recently acquired data may be extracted 610 and sent to a machine learning, statistical, artificial intelligence and other-method optimization system 605, and environmental data, geo-related information, spatial information 611 may be sent to a machine lean machine learning, statistical, artificial intelligence and other-method optimization system 605, wherein from the performance of such machine learning, statistical, artificial intelligence and other-methods deployed for optimization of parameters, coefficients, equations, algorithms, models, processes, decision making algorithms, code, and other systems 605, enhanced parameters, coefficients, equations, algorithms, models, processes, decision making algorithms, code, and other systems may be generated 606, following which such resulting parameters, coefficients, equations, algorithms, models, processes, decision making algorithms, code, and other systems may be tested, verified 607. Further testing of such updated parameters, coefficients, equations, algorithms, models, processes, decision making algorithms, code, and other systems may determine their safety 616. If the updated parameters pass safety verification the parameters (and other aspects) may be sent from such a system out to drones connected to such a system 617. The drones 613, which may be using the same Control Equations with tunable parameters, constraint equations and other control related equations with tunable parameters, and other equations for drone performance and operations as those stored in the cloud system, receive and use such updated algorithms and systems, and as such, achieve the increased performance as enabled by the optimization of such systems 605 using such as the data created, measured, stored, and used in optimization, as in the present invention. If the updated parameters, equations, coefficients and the like fail safety verification 613, they may be sent back 612 to the optimization step 605. Such a system relating to environmental data 611 of an area around a drone may include such detailed information, steps, and process such as described, for example, in FIG. 4. Such verification systems, steps, as in 607, may include, use, or follow systems such as presented as an example in FIG. 5. Such embodiments of the present invention as in FIG. 6 may be deployed through such a framework, system architecture, as shown as an example of the present invention as in FIG. 1.

FIG. 7 shows an example of a spatial map or spatial system or digital twin or digital representation of a flight or operations area that may be used by the present invention for a drone or robotic system to estimate its position or location without GPS. An example is shown of such a spatial system of city, where a spatial area map 701 includes objects and feature sets of a city area, which is used and may be loaded onto or accessible via data connection by a drone 702 that uses onboard sensors to detect objects and perform object recognition 703 of objects in the real world. The drone 702 may use onboard sensors to examine feature sets 704 of elements of its surroundings, wherein feature sets may include various representations of objects with visual data systems, shapes, point clouds or otherwise as shown in elements 705 and 706. Using the feature sets 705, 706 may estimate the position or location of the drone 702. Such a system as the present invention, in deployment of control system tuning and other equation and algorithm deployment, reduces deviation 707 from a desired flight path 708, versus control systems not deploying the present invention 709. Within the present invention, multiple steps may be used, including 703 detecting of elements of the real world using object classification and detection. An object can be compared to objects in the digital representation of the flight area the drone is storing onboard, 704 by detecting elements of the real world and extracting feature sets from the detected elements. The extracted feature sets may be compared to the digital representation of the flight area the drone is storing onboard, wherein feature sets may represent, for instance, flat surfaces 705 modeled as a set of ellipses or object edges or corners 706 modeled as lines or intersecting lines. A smaller set of data, in this case point clouds of an object, may be used to look up the object via AI systems within the stored digital representation of the object, and also as an example of a feature set, a subset of data for an object in the world the system can use to compare what it sees in the real world to the digital representation of the real world. In an example, a corner detector algorithm 706 is used to detect the corner of a building.

Cloud ML concepts may include multiple types of systems, including but not limited to the following.

Onboard Piggybacked 'Black Box Controller' Manipulator. This system would be used when direct access to the flight controller on the vehicle itself is lacking. This would be a standalone computer with all needed sensors that basically manipulates the controls between the transmitter and the original flight computer for any of the purposes described in the proposed invention. It does not need to know anything about the controller or vehicle dynamics, only what the control input channels are and what ranges they respond to—it is treating the original vehicle as a black box. Installing it would involve replacing the receiver connection on the original control chip with a direct link to this device, and the original receiver would then be plugged into this device. It would also need a power line off of the main power board or would need to include its own internal battery. This device would also have some way of achieving internet connectivity for interactions with the cloud when in good service. The original vehicle would be set in a permanent manual mode of some sort, which would then be controlled to achieve the objectives.

Patch for PX4/Autopilot/Open-source Codes and Accompanying Cloud Link Software. This version integrates software on the vehicle's original flight computer and would require no extra hardware. Getting data on and off the vehicle will require the user to physically plug it in and run the included software. The software would extract relevant data from the flight computer, interact with the cloud, and upload any tuning or other upgrades which the cloud suggests. This would allow for retuning via ML, but changes of algorithms would be much more difficult.

Fully Integrated Hardware and Software. In this version, the software would be integrated directly with drone manufacturers' controllers. This gives the most ability to tune the drone and control algorithms themselves DURING flight, which would not be possible with the Type 2 (software patch only) option, and would be possible but quite difficult with Type 1 (piggybacked black box) option. The integration would involve both software and hardware for sensors and communications.

Semi-integrated Fully Off-board 'Black Box Controller' with Small Onboard Interceptor and Communications Device. This is the same concept as Type 1, but all the complex calculations have been offloaded to the cloud. The onboard interceptor still acts as a filter between the original transmitter commands and the onboard controller, but it isn't doing the processing or sensing itself. Its main tasks would be to read the transmitted commands from the receiver and the state from the existing controller and transmit them to the cloud AI, and then to pass through the AI commands into the original controller. The time delays of such a system would be accounted for using model predictive control. The significantly increased computation power of the Cloud AI would allow for a continuously run model of the vehicle to predict in advance what is going to happen, and formulate a list of commands for pass through slightly in advance of when they are actually needed. In an example, if the time delay between AI and drone was 25 ms in each direction, the AI would predict the state of the drone up to 50 ms ahead of the most recent data it has, and determine a set of commands accordingly to make sure all goals are being met through that time frame. The AI would then send a 50 ms set of commands which the interceptor would pass through at the appropriate time. Systems also may cover larger and smaller time delays and distances.

An embodiment of this invention is an iterative and real-time tuning application of control equations and constants using off-vehicle machine learning and optimization analysis. This off-vehicle system would continuously modify vehicle controllers and monitor the performance of vehicles relative to their desired states, with the goal of improving the ability of any particular vehicle to achieve its desired state across many situations. The system would analyze existing data to estimate changes that may improve performance, and make small changes to control variable values accordingly. The off-vehicle system would then wait and monitor performance over time across multiple missions and situations. A realized performance could be compared to both the same vehicle before a change, as well as other similar vehicles under similar desired states and situations. If the change or changes resulted in improved performance in a particular situation, the changes would stay and become a new baseline upon which further iteration was performed when that situation was applicable. This process would continue indefinitely, with performance expected to improve as more and more situations and environments are encountered. The on-vehicle portion of this system would only need to recognize which type of situation it is in, apply the most recent set of system-provided controller values, monitor its performance, and transfer data between the off-vehicle system at reasonable intervals.

An embodiment of this invention is an off-vehicle monitoring application for predictive maintenance using machine learning. This concept builds off the previous concept, and would be used for predictive maintenance. After sufficient data has been collected on an individual vehicle or vehicle type, the off-vehicle system would have a very good idea of what performance to expect out of an individual vehicle. If an individual vehicle was consistently deviating from that expected performance, this is a good indicator of a need for maintenance or repairs. Furthermore, after many vehicles have needed maintenance or repairs, the type of deviation from expected performance would likely be indicative of the type of maintenance or repair needed. This would allow for many types of maintenance to be performed as needed, instead of on a set schedule.

Benefits Sent to Many Drones/Robotic Systems at Once Over Such a Network

Drones can act as both a receiver and a transmitter when out of direct contact with a cloud network or out of direct contact with a manual pilot. If each drone had, for example, a receiver range of 30 km and a transmission range of 10 km, then a chain of commands can be sent down a line of drones indefinitely so long as each drone is no more than 10 km from its nearest drone neighbor. This would allow for a networked connection in non-connected areas via the swarm, which would be ideal for something like search and rescue.

Another idea is that if you had a large swarm of different types of drones available, the system could automatically deploy the ideal drone for the needed mission, depending on the customer defined mission parameters.

An embodiment of the present invention includes other systems that benefit from the data generated, created, and stored by drone flight, that enhances or enables other capabilities, including drone-drone interaction, counter drone interactions and operations, and other systems.

For example, an embodiment of the present invention includes tracking data around drone-drone interactions, and building up statistical databases of how drones interact, autonomously or non-autonomously, so that a drone flying autonomously can predict where another drone, adversarial, friendly, or neutral may fly. Models and predictions of where another drone may go or what it may do may be based on what control system models may predict given its current trajectory, given its anticipated use case or goals, and especially may use data from previously encountered drones.

Wherein a drone is on a platform as described by the present invention, it may fly past or encounter or almost collide with or otherwise other drones during operations, and how the drone on the network behaves, and how another drone it encounters behaves, may all be recorded and data stored in a database as described in the present invention, in such a manner that such information may be used in future encounters between drones, and machine learning and artificial intelligence may be applied to inform, enhance and/or enable future autonomous drone or robotic interactions.

Such systems may be deployed to one, some of, any, or all drones on such a network, it may be a capability that is not local to certain types, shapes, or configurations, of other drones or vehicles on such a platform as described in the present disclosure.

Such examples of estimating the actions of other drones, be they friendly, neutral or adversarial may be used to enable counter drone action. Specifically, using an embodiment of the present invention, estimated paths and/or movements and/or trajectories of drones may be created based on data recorded from previous encounters and other statistical estimates, such that an estimated path of a drone may be created, in order for a counter UAS drone to optimally intercept an adversarial drone. Capabilities such as these may be distributed to any and/or all of drones on such a network, wherein the encounters of each drone, with other drones, enhances the prediction and estimation ability of the whole system and capabilities to each system connected with such an embodiment of the invention.

Additionally, a drone using an embodiment of the present invention may use its knowledge of estimations of drone flight paths, and may use such knowledge to fly in routes that are counter to what is most likely or most expected, decreasing its chance of interception.

Data included in the cloud data storage system may come from drones on the system or other sources. Other sources may include radar, tracking systems, GPS, visual data, and other data that may be of a scenario in which a UAV connected to the present invention was in operation; additional context, for example camera based or GPS based tracking data of another drone, to inform position for position estimates of other drones encountered, may be included.

Verification of control system models, updates, enhancements, and/or new capabilities, as well as other capabilities and/or third party systems may be performed by using the data from prior flights that has been recorded in the database, and also live tested within the cloud while a vehicle flies a new mission.

A dashboard to communicate the advancement of models may be used to show system administrators or customers the tuning that occurs, performance capability differences between prior and current control system iterations, and other capabilities. Other capabilities may include the capabilities of current versus standard methods of accomplishing functions, for example showing how it is estimated that a vehicle would perform using one standard control system, versus how a vehicle actually performed using a tuned or optimized version of a control system. Such comparisons may also be made for various iterations and tuning versions of other capabilities, image recognition, positioning without GPS, obstacle avoidance systems, radio communication systems and bandwidth optimizations systems for example, and/or other systems. Any capability enhancing system that can be added can be compared via a dashboard, to show how the vehicle would perform with and without such a system. Any system wherein it can be tuned and thus improve over time can also be shown, such that the performance improvements with tuning over time can be shown.

As data is included in the system, including photo and video data, including 3D photos, stereoscopic photos or otherwise, such photos can be used by other drones in the system to enable them to maintain positioning without GPS such that based on a flight that used GPS, images can be geo-tagged and so when a different drone flies in such a region, it can pull from the database the images and using its computer systems recognize that it is seeing an image from its cameras that another drone using such an invention has seen, and added a geo-tagged photo to such a system, and so another drone flying that is using the invention can thus ascertain its location even without GPS. This is an example of a capability that can apply to multiple vehicles across multiple classes and sub-categories of vehicles using such the present invention.

Other examples of functionality and capabilities that can be enhanced by multiple vehicles flying and adding to the data system include knowledge of low-communication connectivity areas, combining photos taking from flight with geo-tags to be used for positioning and other purposes, merging images taken into 3D area maps that can be used for positioning and other purposes, recording certain areas of high wind gusts, which may be natural and/or occur from areas between buildings.

As with such maps as described within the present invention, 3d area maps, which may be called spatial maps, digital twins, environmental maps, or other terms describing such a system, may be created by drones or other robotic systems connected to such a network or cloud system, or may be brought into such a system from other sources. For example, 3d spatial maps or environmental data or images or distance measurements or the resulting maps from imagery, distance maps or environmental sensor data may be created by drones connected to the cloud system that have such sensors on board or may be created by other sources such as satellite maps, people with cameras or other sensors, reconnaissance aircraft or other vehicles, cars, trucks or other vehicles, or existing data bases, government databased and private company databases, and added to or uploaded into such a system, wherein any and all such data sets may be used. Such influxes of data may be added to existing spatial maps, have certain portions of data extracted and merged with existing maps or spatial sets, or used in a protected siloed method of storing data for only such uploaded data.

Spatial map systems may be created with cameras, 3d cameras, stereoscopic cameras, lidar, nodar, sonar, electromagnetic wave based sensors, distance measuring sensors, radio waves, ambient background radio waves, cell phone signals, other background signals noise and measurable detectable systems, video monitors, data created by autonomous cars and aircraft, and other vehicles.

Wherein such spatial systems may be created, certain subsets of detectable data from objects detected may be highlighted, extracted, and combined into lower total data volume systems, wherein subsets of point cloud data and other object feature sets are used, such that vision based object detection systems can ascertain what objects may be in their field of view using less data than a full visual representation of the object. Such feature sets may include edges of an object, colors of an object, shapes of an object, shapes included in an object, non-uniform but AI detectable signatures of an object, and may include linear, angle, and other descriptors of an object that may be detectable by an object recognition system wherein such a system may use cameras, distance measurement sensors, and any sensors, including sensors described within the present invention as those that may be used in creating such a spatial environmental map. Stored data, objects, or otherwise may be encoded with GPS, location, geospatial, and other data and meta data. Meta data may include GPS, locations, time of data acquisition, typical weather information, live weather information, typical traffic flow or volume versus time and route data for drones, cars, people, animals, objects, and other robotic systems or any of the above, and at least one of other data typically considered meta data with regards to photos, video, datasets, surveillance or reconnaissance information, or any other information saved and connected with such spatial data wherein such data can be looked up when a computer program examines such a feature or component of a spatial or environmental data set. An example method may comprise multiple objects being recognized or identified, and using triangulation to determine the location of the drone, based on the locations of the known objects.

Spatial environmental datasets may be stored in full, wherein extracted feature sets that represent the spatial environmental datasets may be created with only the subsets of information, extracted feature sets, sparse matrices, and other representations of the spatial environmental datasets wherein such extractions are smaller in total bytes of storage data. Complete or subset spatial maps may be uploaded, downloaded, or put onto a drone or robotic system in total or partially on or during operations, and updated, complete, or partial such maps may be added to, sent, received by a drone or robotic system during any operations. As may be optimized based on available communication systems, data including 3d spatial environmental information may be sent to such a robotic system to provide data for an upcoming portion of a mission and/or for a new route or for a same area with updated information.

Sensors onboard a drone or robotic system may detect information from an area around the drone or robotic system, compare what it detects to what exists in a stored or accessible spatial or environmental data set, and make estimations about a location of where a drone may be, given the data the sensors may detect. For example, a spatial data set may be created for a flight area between two buildings, and the objects and data within such a spatial map may include geospatial data tagged as meta data along with feature sets of such a map, and cameras or sensors on such a drone may detect a certain visual item or point cloud from the surroundings of the drone, compare the measurements with the onboard flight area spatial map, then infer the location of the drone by estimating a location of the drone using the combination of GPS or geospatial information associated with objects within the spatial map that the drone believes it is detecting in the real world, using its sensors. Such a system may provide and create a layer of software that may be installed on any drone or robotic system, wherein such a system may let such a vehicle using the system be able to estimate its position without connection to any GPS networks or any networks, and wherein a vehicle may have greater knowledge about its surroundings based on its having access to such a stored spatial map system and being able to ascertain its position within such a digital creation or stored data system of the surrounding area or an area related to the drone or robotic system using such a system as described.

Such a spatial awareness system may be deployed on robotic systems such as manufacturing robots wherein by having access to a live digital information system or map, or 3d spatial map, of their surroundings, they may be better able to or more safely able to function in environment with humans or other robots, or any dynamic or changing environment.

For when drones connected to such a network measure data to add to such a system, When a tree is young it uses scaffolding, but then grows and grows on its own over time and no longer needs scaffolding for support. Similarly, drones may need support initially, but then once they learn their areas, they may no longer require such support. Many major flight routes over larger roads may be pre-mapped. This pre-mapping may cover a certain percentage of all delivery routes. Then as drones come to their final destination, they'll have to leave the pre-mapped major roads, at which point they'll use normal GPS and gather all of the visual data they see with their onboard cameras to add to the mapped system. After this first delivery to a location, there will be a good-bit of data added to the system covering the last piece of the route. This data is geo-tagged and added to the system. Any subsequent flights to that same area will of course again record all of the visual information to add to the system increasing detail and fidelity over time.

Drone safety systems may be provided through the present invention including wherein during the first deployments of UAV drone delivery, it is expected that there will be people monitoring what the drone is seeing during the flight for safety, so even without a backup GPS and safety/precision-landing network covering that last piece of the route, the UAV would still have the safety of someone monitoring it, during the first deployments. As this scales out, drone monitors may start to manage more and more drones at a time. UAV monitors may track 1-4 drones initially, followed by 8-12, and eventually up to 50 at once on their tracking screens.

Major baseline roadway systems methods for air highway routes may be created, wherein one may expect UAV delivery to roll out in suburban and urban areas first by using aerial highways built over roads. Airspace over individual property is a bit more dubious around who owns what at what elevation, whereas if someone shoots down or knocks out a drone over a road, that's actually a federal or state crime—so people will be less likely to worry about privacy, and have much greater penalties if they take-out a drone that's flying over a road.

As UAV cargo delivery highways may be deployed over roads, a partial focus of this disclosure is on the control-system updates to a UAV (by software download)—to add the tuned control algorithms to ensure they can do the proper turns to follow the designated roads. Hub and spoke roll-out methods may be used, wherein the first implementations of this using a hub-and-spoke model branching out from inventory centers. Those roads or routes with the capacity to take the highest volume of drones may be determined, and those routes/roads would be prioritized for initial mapping.

Such a system as the proposed invention includes predictive maintenance, where data around performance, power used, and other data combined with data around which components need replacing when, can be used in machine learning and artificial intelligence techniques to allow prediction of needed maintenance across drones of many types.

Additionally, such a system as the present invention is able to merge tuning from visual and spatial information systems with machine performance and tuning systems, wherein when visual systems detect certain sets of objects or scenarios, parameters within a control system may be adjusted given the expected required maneuvers. Such a methodology may be considered analogous to giving muscle memory to drones and robotic systems. For an example of the deployment of such a system of the present invention, an embodiment of the system may detect the presence of a stop sign, and therefore update tuning parameters to optimize a vehicle for a sudden stop, or such a system may detect a yellow light as in at a stoplight or intersection, and so adjust tuning parameters or other maneuvering or control system equations to optimize or prepare for sudden obstacle or vehicle emergency maneuver abilities. Any visual, spatial, distance, point cloud, meta data, or any data stored in or accessible by such a system as in the present invention may be tied to, calibrated with, or used in tuning and optimization of, any of such control equations, navigation and routing decision making systems, or any of the tunable optimizable or otherwise systems as used by drones or robotic systems.

Furthermore, real-time trajectory optimization, enhancement or adjustments may be made. Trajectory enhancements may be part of the present invention, may use data from such a system or use models or methods described outside or beyond data from a cloud system. Trajectory enhancements may include means, methods, outcomes, algorithms, tactics such as improved vehicle path following with respect to the original intended trajectory, reduced vehicle energy usage via intentional deviations from the original intended trajectory, reduced vehicle acceleration magnitude, reduced frequency of vehicle accelerations, reduced vehicle energy usage due to the secondary effects thereof or reduced magnitude and/or frequency of accelerations experienced by a payload which is hanging or otherwise under the direct influence of the vehicle, reduced deviation of the path of the payload from an initial intended trajectory, reduced oscillatory behavior between vehicle and hanging or otherwise directly influenced payload, accommodation of changing desired flight speed, accommodation of legal limitations to vehicle operation, and/or additional related items or topics.

Real time nominal trajectory modification is the act of continuously changing the desired state of the vehicle to some state that is different from the originally calculated desired trajectory of the vehicle. The states of interest in this case are the positions, velocities, accelerations, and other parameters of a vehicle and a payload. There therefore may be in this example 18 time-dependent parameters which describe potential trajectories for the vehicle, and an additional 18 for the payload under the influence of the vehicle. Depending on the dynamics of the specific vehicle and payload, no more than 6 of these parameters defining a trajectory may be independent, with all others dependent on some combination of 6 or fewer independent parameters. For vehicles and payload systems of different configurations, different parameters and degrees of freedom would be entailed.

In the case of a copter design with all rotors oriented vertically, only three of these parameters are independent. In explaining the concept of the invention, the three independent parameters defining a trajectory may be chosen to be the x, y, and z positions of the vehicle, although this concept applies to any combination of independent trajectories the completely define a system.

Of and as of an example of the present invention using methods and technology of the present invention to create, plan, optimize, define, deploy flight path routes, such a system as performed by the present invention may be accomplished in multiple ways using components of the present invention. A system may include data stored from multiple drone flights, an implementation of the present invention includes using data from prior drone flights in an area and flight telemetry and performance data, such an implementation of flight path optimization, generation and optimal generation may include taking multiple flight path trajectories from an internally stored database, examining performance data and flight telemetry from those flights, and selecting portions of the prior flight paths and trajectories that align with and/or correspond with and/or occur in tandem with, desired performance and flight telemetry data, and extract those flight paths, including GPS locations of flight path, speed of vehicle at those points during those flight trajectories, degree of turn during such portions of flight trajectories, as well as options to merge, via average, weighted system, algorithmic voting system, or other systems, such sections of the flight paths and trajectories that correspond with desired flight performance and telemetry data.

Furthermore, such a system may use such complete flight trajectories, or portions thereof, and corresponding performance and telemetry data, and use that information in models to model, estimate, predict, or create optimal flight paths, wherein flight path trajectories may be used as an input to a tunable model, corresponding performance and flight telemetry data may be used as an output, cost, constraint, or otherwise used in a model, and various statistical, machine learning, artificial intelligence, and other systems may be used in such models, where tuning may occur in order to optimally map flight routes and components of flight routes to performance and flight telemetry data. Various artificial intelligence, machine learning and other systems may be used to create such relationships, and may include neural networks, deep neural networks, convolutional neural networks, black-box AI methods, linear regression, power analysis, wave equations, functions with real and unreal components, vector analysis, separating hyperplanes, cluster analysis, gradient descent methods, the Runge-Kutta method and variations, numerical methods of solving ordinary differential equations, numerical methods for determining minima and maxima of cost functions, and other mathematical systems and methods deployable with multi-variable systems.

In such deployments of systems for flight path planning, optimization, generation, and in other deployments as covered in the present invention, components of flight trajectories may include speed of vehicle, pitch, roll, yaw, position, and rates thereof, radius of turn, proximity to surroundings, power levels of vehicle, power used, motor or actuator output, and any other features, attributes or metrics related to a flight trajectory and drone or robotic system data from such a flight trajectory, maneuver, and timeframe.

Such a system as deployed by the present invention may optimize a flight path for a drone a time interval in the future, for example 50 milliseconds in the future, using the prior recorded aggregate flight trajectory within the proposed system, or using specifically the current flight path of the drone in the present example. The system may search its database for similar flight trajectories, down-select this grouping to pull only the most desired flight trajectories and, based on these similar flight trajectories, perform a mathematical operation to combine the flight trajectories, and thus ascertain an exemplary optimal flight path for the vehicle for 50 milliseconds in the future, or for some other time period. Additionally in the present example, an embodiment of the present invention may have models for power use during flight, maximum speed during flight, safest flight route, or other models, wherein models are tuned from aggregations of flight trajectories and performance data in the system, wherein such models can take the current position, trajectory and desired characteristics of the flight for the drone in the present example, use these as inputs to such models, and take as the outputs from such models as the optimal flight route to be used by the drone in the example 50 milliseconds, or another time interval, in the future.

Such systems may also work scaled out across swarms of drones, where the above methods can be applied to groups of drones, also called swarms of drones, performing flight missions or flight maneuvers in tandem, wherein the paths and/or expected behavior of each drone may be used in tandem is both inputs and outputs to all of the path planning and optimization systems and models for all of the drones within such as swarm.

Nominal trajectory refers to the originally calculated trajectory that describes a path between two or more desired states, thus turning two or more discrete points into time-continuous curves. At any point in time, the desired state of the vehicle lies somewhere on the nominal trajectory. The better the control of the vehicle is achieved, the better the actual trajectory realized will match this nominal trajectory. In any real system, there will be error, and the realized trajectory will not perfectly match the nominal one. Additionally, the nominal trajectory may have been planned with or without respect to optimizing any combination of metrics. As such, this system would take into account the original nominal trajectory, the current system error and history of errors along the current trajectory, and any combination of desired metrics for optimization (which may carry different weightings) and calculate a new, manipulated trajectory for the vehicle to follow. The desired trajectory which the vehicle controller is attempting to follow would be this manipulated trajectory instead of the original nominal trajectory.

Further inputs to this system would include outputs from an off-vehicle system such as a cloud-based AI system. This system would compare the variables and states describing the current situation of the vehicle, and apply learnings from other vehicles which had previously encountered such situations to influence the generation of the new manipulated trajectory.

This concept can apply at multiple scales, with examples of each as follows. Between two cities, this may be used to avoid no-fly zones or to optimize a route for efficiency or time. Within a neighborhood, this may be used to minimize interferences and the risk of collision between multiple vehicles operating in close proximity. In tight environments, this may be used to avoid obstacles while minimizing on-vehicle accelerations, which may be essential for missions like package delivery or filming. At very small scales, this may be used to keep the vehicle stable when unexpected disturbances are encountered, such as a large gust of wind or an animal encounter.

Systems, methods, equations, that may be used in control systems and/or in tuning include but are not limited to: Linear Regression; Logistic Regression; Support Vector Machines; Random Forest; Naïve Bayes Classification; Ordinary Least Square Regression; K-means; Ensemble Methods; Apriori Algorithm; Principal Component Analysis; Singular Value Decomposition; Reinforcement or Semi-Supervised Machine Learning; Independent Component Analysis; Decision tree; SVM algorithm; Naive Bayes algorithm; KNN algorithm; Random forest algorithms; Dimensionality reduction algorithms; Gradient boosting algorithm; and AdaBoosting algorithm.

Control System types and modes may include but are not limited to: Model predictive control; Open-loop and closed-loop (feedback) control; Closed-loop transfer function; PID feedback control; Linear and nonlinear control theory; Analysis techniques—frequency domain and time domain; System interfacing—SISO & MIMO; Controllability and observability; Linear systems control; Nonlinear systems control; Decentralized systems control; Constraint equations; Barrier functions; Power minimization functions; Deviation from desired flight path minimization functions; Euler's Formula; Convolution; Convolution Theorems; Unit Step Functions; Unit Ramp Function; Unit Parabolic Function; Error Constants; Position Error Constant; Velocity Error Constant; Acceleration Error Constant; Transfer Functions; State-Space Equations; Transfer Matrices; Mason's Rule; Feedback Loops; Closed-Loop Transfer Functions; Open-Loop Transfer Functions; Transforms; Laplace Transform; Inverse Laplace Transform; Fourier Transform; Inverse Fourier Transform; Star Transform; Z Transform; Inverse Z Transform; Modified Z Transform; Transform Theorems; Final Value Theorems; Initial Value Theorem; State-Space Methods; General State Equation Solution; General Output Equation Solution; Time-Variant General Solution; Impulse Response Matrix; Root Locus; The Magnitude Equation; The Angle Equation; Number of Asymptotes; Angle of Asymptotes; Origin of Asymptotes; Breakaway Point Locations; Lyapunov Stability; Lyapunov Equation; PID; Controllers may use Time Domain methods and systems, Laplace Domain; Proportional; Proportional+Integral $KK_si+$ or $K_ss+\alpha$ where $\alpha=KK_i$; Proportional+Derivative $KK_sd+$; Proportional+Integral+Derivative (Three Term Controller), $KK_sK_sid++$; Lead Controller $bsasK++$, where $a<b$ or $T_s1sT1K\alpha++$, where $\alpha<1$; and other similar equation systems, Lag Controllers; Non-linear controllers; Neural nets; Deep neural nets; Genetic algorithms; other mathematical systems and equations Control systems, methods and tactics may also include Picard iterations, Gronwall-Bellman methods, stable and unstable subspaces, manifolds and tangent spaces, stable manifold theorems, exponential stability, Lyapunov methods applied to linear systems, stability of linearization, instability results, converse theorems, input-to-state stability, barrier functions, barrier to Lyapunov function relationships, stability within time-varying systems, invariance principles, limit cycles, Poincare Bendixson theorems, connections with barrier functions, Poincare maps, stability of limit cycles, Bendixson theorems, linearization and Hartman-Grobman methods, safety functions, closed orbits, and other methods that include methods tailored to work well with data and for optimization of equations and/or parameters with data or other methods.

Adaptive control systems may be included in the present invention wherein learning based control systems, such that algorithms are used to update parameters or equations live during flight to adapt controllers and/or a control system based on various factors is included on a flight vehicle, used on a flight vehicle individually and/or as part of a cloud based tuning system. Learning based controls as applied and described in the present invention include adjust parameters live during flight and/or before flight in order to achieve stability, reduce power use, maintain a certain flight route, and/or other purposes.

Adaptive control system and method, automatic AI & ML enabled control system that adapts to system needs & requirements allows enhanced flight performance and stability, and may incorporate data to optimize such a flight system. Variance may be reduced in a model or a plant and/or control equations.

Data uses as used in such a present invention may include reducing variance, and ensuring recursive feasibility.

Also included in the present invention is a system wherein flight vehicles, drones or robotic systems may be tested and verified and functioning at a certain standard level in such a manner that through such a system, approval for operations or verification of safety may be ascertained. For such verification, a drone flight is performed, the same flight is simulated in a verification system of the proposed invention. The flight may be verified if the drone performance aligns with the simulation performance. The simulation may then run across edge cases of safety for the drone, and other drone flights may be performed, and if the other drone flights align with the other simulations of those same flights, and the simulations of the drone for test cases at the edge of feasible show the drone behaved as expected, it can be verified as safe based on the adequate representation of the drone in the simulation, and the adequate safety performance of the drone in the simulation. Drone performance characteristics and metrics may be calculated for a drone using data relating the performance and flight maneuvering of the drone, flight telemetry data, and with such information, estimated specification about drone motors, size, weight, propellers, and other systems, may be estimated, which may be used in simulation to create a simulation of a drone as close to the real world version of a drone as possible.

Various statistical, machine learning, artificial intelligence, and other mathematical, modeling and analysis methods may be deployed within the present invention. Such machine learning based on other systems may be deployed on and may include any and all aspects of data that may be generated, recorded, created and exist for drones, robotic systems, and operations. Such data may include, but is not limited to, flight data, drone telemetry data, flight vehicle robotic system data, and other data and meta data, and may include data measured over time during drone flights and system level data. Drone size, weight, number of motors, makes and models of components, communication systems, location, time, weather, pilot, environmental data, and other data may be included, drone speed, velocity, acceleration, orientation, rates and moments thereof, derivatives of such parameters, measurements of such parameters per time unit during flight, acceleration, inertial measurement unit records, heading, pointing, GPS readouts, communication signal data, records from drone environmental sensors including distance to objects in the area of the drone, visually recorded data, any and all data recorded by any and all compute elements, flight controllers, sensors, hardware on the drone, which may include flight mode, position, timing, movement and orientation data, power use data, motor use data, and other data that is possible to be generated by a drone or robotic system. Data from outside systems, cameras, sensors, notes about flights, may be included. Any and all such data as may reasonably be used in the tuning and refinement of drone and robotic system deployment may be used.

Within the context of the present invention, various statistical, machine learning, artificial intelligence, and other mathematical, modeling and analysis methods may be deployed within the present invention. Such types of ML/AI systems may include neural networks, deep neural networks, convolutional neural networks, black-box AI methods, linear regression, power analysis, wave equations, functions with real and unreal components, vector analysis, separating hyperplanes, cluster analysis, gradient descent methods, the Runge-Kutta method and variations, numerical methods of solving ordinary differential equations, numerical methods for determining minima and maxima of cost functions, and other mathematical systems and methods deployable with multi-variable systems. Quantum computing systems and methods may also be employed. Use of constraint barrier functions, decision trees, random forests, classifiers, clustering algorithms, smart search, data aggregation, interpolation, and any other computer science, mathematical, statistical, artificial intelligence, machine learning, and other systems commonly applied to multi-variable data sets are included within the present invention.

Data normalization may occur, especially in relation to merging information from drones of multiple form factors, and equalization or normalization may occur around vehicle center of gravity, variance, averages, residuals, and standard normalization systems.

Wherein there is missing data from any drone connected to such a system, various interpolation systems may be used, and the fact that data is missing may also be used in machine learning and other models within the present invention. If, for example, signals from three motors are received for a four motor flight vehicle, the system may predict a motor issue, and a three motor control algorithm may be uploaded to the drone, and it may therefore get an updated navigation plan to approach a safety landing area. In such a case additional safety systems may be activated, including landing at the closest of a set of pre-planned safety landing zones, exclusion of sharp turns may be enacted for flight maneuvers, and other added constraints to flights or other safety features may be added.

Furthermore, if in the case that sensor data is being recorded sporadically, missing data may be interpolated. If it appears not that a motor is broken, but that a data recording system is functioning improperly, missing data may be interpolated using standard practices. Data from a vehicle or flight is not lost or inherently tainted as the result of missing data. The missing data and a note that there is missing data may be tagged within the data recording system and treated appropriately as per for use with models, analysis and inference as per the models deployed in the system. Missing data may be from motors, sensors, spotty GPS, or other systems on, around, related to, recording data about or for, a drone or robotic system.

The proposed invention is hardware agnostic. Specifically, the proposed system stores and records operational and meta data for drones and robotic systems, performs tuning, optimization, refinement of control systems and control and constraint algorithms using such data, records spatial data about a region of operation and compiles such information and shares such information with drones or robotic systems connected on such a network, and gives connected drones and robotic systems memory and the ability to learn over time, and as such, embodiments of the proposed invention are not dependent on an exact hardware configuration or specific computer or sensor system. Specifically, any drone or robotic system that is capable of recording flight telemetry data, speed, position, and capable of housing, storing, or using a control equation or control algorithm, is capable of working with the proposed innovation. Any system that includes control equations may receive, use, or benefit from tunings and optimization that may come from the proposed innovation.

In such, the system is vehicle agnostic in that it can be deployed across a vast array of drones and robotic systems, and perform the outlined operations, steps, and deploy the present invention.

Similar flight trajectories may be defined in many ways, including similarity analysis, location, length, average g-forces of turns, speed, angles of turns, and may be determined to be similar using algorithms. Furthermore, sub-components of flights, specifically, maneuvers and flight vehicle actions, may be classified or defined using algorithms. Flight maneuver classifiers may use clustering algorithms, may smooth flight telemetry over time using n data points or t time intervals, classification algorithms including decision trees and other ordered, non-ordered, supervised and unsupervised, and other classification systems may be used.

Such systems enable the proposed invention to classify different flight maneuvers, like high-g turns, emergency avoidance maneuvers, maneuvers around other drones when interacting with drones and drone traffic, and therefore, such maneuvers may be optimized. For example, maneuver classification systems may be used to classify emergency turns, flight telemetry data can be combined with different tuning parameters used on different drones, and visual information from drones from the times surrounding such maneuvers can be combined, so that an optimized result would be where the optimal tuning parameters for such emergency maneuvers can be deployed to all drones of similar type on the network, to be loaded into the control system when such drones are traveling at analogous speeds, and wherein whenever camera systems on such drones detect similar visual features in an environment, such emergency maneuver parameters can be pre-loaded for use in such a maneuver.

Such systems may provide a kind of muscle memory to drones and robotic systems, where when onboard sensors detect certain traits in an environment surrounding such a drone, certain control equations or tuning parameters or change of vehicle velocity may be enacted. Definable traits of an environment may include human-definable objects such as detecting a stop sign, or may include systems detectable but not identifiable as certain objects by a human, but wherein algorithms in such an environment are able to detect patterns, responses, etc. For example, AI systems deployed through the present invention may detect a correlation between the position and speed of multiple other drones in a certain flight area, and when such instances occur, such instances also tend to correspond with a drone having to make an emergency flight maneuver, such that although the exact systems of speeds and positions of these other drones would not be immediately detectable to a human, AI systems deployed through the present invention detect a pattern in this case, wherein certain flight path and/or vehicle control systems are deployed. Such scenarios could include distance sensors measuring point clouds relative to environments surrounding a drone, visual systems that detect objects, radio waves detected and used by a drone, sonar, and/or any electromagnetic wave based, or other, sensors and systems.

Patterns in determining similarity between flight routes, and similarity between current environmental scenarios and prior environmental scenarios stored in a system as part of the current invention, and in determining similarity between objects detected in the real world and objects stored in any 3d spatial or digital representations of a flight area, may be performed with similarity matrices, point clouds, feature extraction, clustering methods such as k-means and DBSCAN clustering, eigen value comparison of system description matrices, neural networks, deep neural networks, convolutional neural networks, and other non-here named machine learning and artificial intelligence systems and algorithms. Such systems may run locally on drones or robotic systems, in a cloud stored system such as hosted on Amazon Cloud Services or others and connected to a drone, and hybrid deployment systems. Likewise, such systems may be deployed and run with distributed computing spread across a network or networks of robotic systems. Drones and flight vehicles may be robotic systems.

In and for various embodiments of the proposed invention, different levels of requirements for sensor systems may exist, and desired use cases of such an invention may dictate the performance and capabilities of sensors chosen to enact such an invention. For example, when a drone performs object avoidance, the speed of the flight, the distance at which an obstacle can be detected, and the sensor capabilities are related. For a drone traveling at a high speed, high detail cameras would be needed to provide enough pixels of an object so that the object is identifiable from a distance wherein the drone, given travelling at speed, is able to perform an avoidance maneuver in time prior to encountering the obstacle. Within the present invention, spatial area maps of a flight area may be stored in a cloud data system in high fidelity, wherein a drone deploying the present invention that happens to have low resolution cameras may be limited to traveling at a low speed, such obstacle recognition of objects in the real world, wherein the objects can be compared to objects in the stored spatial map, can be performed fast enough to let the drone lookup those objects and feature sets in the stored spatial map digital twin, so the drone must be limited to a slow flight speed.

When spatial map systems of flight areas are created, even if drones adding data to the system have low resolution cameras, they can all add different information that they happen to capture during flight, and over time, the detail is all combined and merged in such an environmental storage system, and so the level of detail and fidelity increases over time.

When distributing spatial area maps, digital twins of a flight area, complete or partial flight area maps may be shared with a drone, for local storage, wherein based on speed of flight, communications quality and mission use case, portions of a flight area map may be sent to the drone as it reaches certain waypoints during flight. Information sent to a drone of the spatial area map system may include full 3d spatial information, images of objects in a flight area, point clouds that represent objects in the flight area, feature sets of objects in such an area, and/or any subsets of information that are deemed adequate to be used by the proposed system on the drone, in such a use case. Backup safe-flight-route area maps may be included on drones, regardless of planned flight route. Such backup and safety routes and digital spatial information stored for such routes may include emergency landing areas.

Embodiments of the proposed innovation include creation of such visual spatial systems for landing zones of flight vehicles, and deploying the information and system to any drone about to use such a landing zone, wherein such a system can be sent to the drone over wireless communication systems when and as a drone may be using a take-off or landing zone.

Part of the present invention are the ML/AI systems that compare drone sensor readout with digitally stored representations of the flight area, minimum feature sets, objects and data for the spatial environment that allow for comparison with the drone's surroundings as measured by the sensors on the drone, and data storage size, compute power, communications environment, and other characteristics of the operational system that confine how an embodiment of the proposed system is deployed. Optimization to function ideally in constrained compute power and data communications environments is part of the proposed innovation.

Data compression methods may be used when handling amounts of data from sensors and to and from drones, sensors, and cloud data systems. Data compression may be performed on data during transmission or within models or a storage system of the proposed invention. Additionally, algorithms may be refined and created to specifically function optimally as within the constrained data environment of sharing large data sets of small bandwidth channels, sparse matrices or datasets, or otherwise.

If there is a high resolution video of 2 megapixels per frame, 1200 by 1920, that is 8 bit and full color, and functioning at 20 fps, the resulting data stream is large and stores likely more data than can easily be loaded into memory local memory—in such a case, there may be feature extraction algorithms that extract pre-determined smaller data feature sets of the objects in such a video, where the data storage volume of said feature sets is significantly smaller, and the feature sets have been determined beforehand, or may be determined via the present invention by black box AI systems or otherwise, and thus extracted.

Additionally, such large data sets may be stored wholly or partially in a data storage system of the present invention, wherein storage space and compute power is less limited, and through such methods, low data volume feature sets and other analysis, can be extracted, performed, deployed.

Data can be stored locally and sent to a storage system following a flight, or sent to a storage system live during flight, or partially sent to a database and partially locally stored. Such systems may be applied to visual data, spatial data, lidar data, and any other data in relation to drones and robotic systems.

Various statistical, machine learning, artificial intelligence, and other mathematical, modeling and analysis methods may be deployed within the present invention. Such systems handle complex multi-variable data sets, and map, model, correlate, and predict complex, non-linear systems. As such, complex tuning and training systems are deployed. As deployed in the present invention, models are tuned and trained using various sets of data from drone and robotic system flight telemetry, performance data, meta data, and environmental data. Data from a data storage system is broken into inputs and outputs, and models are tuned using the data. In some cases, the same data may be an input or output to different models, and estimation, inference, and tuning may be the desired output or result of models. Variables may include any of the variables described within the present invention, position, velocity, orientation, speed, acceleration, environmental data, and data can include any data recorded from any flight control systems on drones or robotic systems, and data may include created variables created through the combination of measured variables.

For example, data from many flights over different trajectories from vehicles of different shapes and sizes may be stored in a cloud system, the data for the desired flight path may be compared to the data for the actual exact GPS coordinates a drone followed during flight, and the error between a desired and achieved flight may be calculated; additionally, the flight maneuvers, straight flight, sharp turns, soft turns, flying upwards or downwards, etc., may be defined and classified, and data may be normalized based on vehicle size, weight, thrust, number of motors and other factors, and the tuning parameters for control systems or constraint equations for all of the drones may be taken as an input to a model, and the difference between desired versus achieved flight may be taken as an output for such a model, and thereby through such a model, the relationship between tuning parameters and deviation from desired flight path may be created and mapped, and through such a model, optimized tuning parameters that minimize deviation from desired flight path may be achieved. In such a case, for example, a neural network may be used, wherein multiple numbers of nodes may be used and multiple levels of nodes may be used, and weights are defined through tuning of the model. It may so happen that the number of nodes to be used is chosen by other models, AI systems, genetic algorithms or otherwise, and it may so happen that the number of layers, configuration of layers, or combinations of neural net results with a voted upon or weighted set of results from multiple machine learning models may be used in combination, wherein such combinations may be input manually or created via AI algorithms. Any of the above or other systems may be tuned using standard leave one out cross validation methods, other methods, and/or the then determined models may be run using all of the data in order to use maximum data for best model parameter fit.

Such an example is outlined for a neural net, but could certainly be accomplished with deep neural nets, convolutional neural nets, regression trees, spline, linear and non-linear regression systems, voting systems that combine the results of multiple models, cluster based estimates, genetic algorithms, and other black box and non-black box supervised and unsupervised systems. Object recognition systems and algorithms are also run on images and videos and other formats of data within the present invention. Any of the model types and systems may be used with standard or otherwise cross validation and other tactics to verify fit, performance, and mitigate over and under fitting.

Furthermore, for example, additional examples of such systems may include taking the flight route and control parameters as inputs to a model and the power use or actuator variance as an output of such a model, and solving or optimization for minimal power use or minimal variance of motor actuators. Additionally, such systems may be deployed to minimize acceleration of a drone or flight vehicle, to maximize flight speed or agility or sharpness of turns, or other parameters. Any of the included parameters or other parameters may be used as inputs, outputs, or otherwise included in models as related factors, wherein any machine learning, AI, statistical, and other models may be deployed via the proposed invention in order to optimize, tune, adjust, refine, enhance, a drone or robotic systems performance, stability, power use, smoothness, or optimize, maximize, minimize, or otherwise chose and metric of such a system.

In deployments of the proposed system, Bayesian technique may be used, where an existing estimate for a parameter, model, constraint may be used as a prior distribution, and as additional data is brought into the system, a posterior distribution or estimate is created that includes the increased information. For example, if a set of tuning parameters for a control system constraint equation exists, using data from 50 drone flights stored within an embodiment of the present invention, and a drone is flown an additional 10 times and that flight data is added to the tuning and optimization system, a model may be run to estimate new optimal tuning parameters, and such a system may use the initial set of tuning parameters as a prior distribution, and then based on that prior distribution and the running of the parameter tuning model, a new set of tuning parameters is generated, such results may be considered a posterior for the tuning parameters. Such systems may be deployed, within the present invention, on any of the metrics used as inputs, outputs, or otherwise with, models deployed through the present invention.

Additionally, a Bayesian framework may be deployed with image recognition systems, where an estimate for the classification of an object in an image is informed via a prior, using the estimated for that object from a prior time interval. Such deployments of this Bayesian framework may be deployed to object recognition, object classification, with video and still images, and in and related to any vision, 3D point cloud, feature sets, and other estimates in relation to and within the present invention.

A data storage system as within the present invention may include flight data and performance data, visual, distance based, and feature sets from sensors on a drone or robotic system about a surrounding environment, spatial systems created from outside data sets and connected with or loaded into a same data storage system as within the present invention, and may be stored fully or partially on a cloud data storage system such as Amazon cloud services or Microsoft azure, or partially on a single or multiple drones or robotic system, and various hybrid deployments.

The proposed system and invention includes predictive maintenance as within the models run on a cloud storage system on data from multiple drones or robotic vehicles connected to such a system. For example, based on prior flight data, a model may be created to calibrate expected motor actuator output values with flight dynamics and inertial measurement unit acceleration data, wherein if measured actuator values, desired control commands sent to motors, and achieved vehicle dynamics do not align as per such a model it may be determined that a motor, and which motor, is not functioning properly. Such a system may be run automatically on such a cloud system, where data may be automatically uploaded to a system of the invention, and a predictive maintenance model may be run, and reports of possible performance issues and areas for maintenance may be delivered to a drone operator. Such systems may also not be run automatically, but may require a user, a drone operator or fleet operator that is using such an invention, may have to click a button to intentionally run such a system. Various capabilities, features, components, aspects of such an invention may be separated by paywalls and product tiers for different types of users, all covered as within, hosted on, by, such an embodiment of the present invention.

Other predictive maintenance models may include the tuning and verification of such a model on a cloud stored system, wherein a resulting model may be deployed to run locally on a drone or robotic system.

Maintenance systems and maintenance events modeled and predicted by such an embodiment of the present invention include motors, electronic speed controllers, sensors, actuators, servo motors, cameras, winch systems, or any other system, sensor, or component of or related to a drone or flight vehicle working in a way that is different than desired or different than standard functionality. Any systems that create, provide data or are measurable, detectable, or otherwise, may be included for maintenance or error in functionality prediction as within the proposed invention. Vibration of system, vibration of components, performance of components versus expected performance, and other metrics and data generated, may be used in such models, and models, tuning, refinement, creation, may be any of such models, systems, methods, or otherwise, as described in the present invention.

The system presented in the present invention is designed to include graceful degradation and backup safety redundancies for the system. For example, a system may be implemented in a modular format, where functional blocks of the present invention may be deployed together or only with modules. Functional blocks or modules may also be deployed in a cloud system as described in the present invention or may have components of the present invention deployed locally on vehicles or drones or on local electronic devices. Additional safety systems and processes may be deployed through the proposed innovation. As safety systems and requirements may require a drone to maintain a certain flight distance from other drones and obstacles such a system as the present invention, given its connection with drone flight controls and navigation, may automatically maneuver a drone to maintain required safety distances and flight paths relative to detected or known flight paths, locations, of other flight vehicles.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass any combination of the disclosed embodiments, in whole or in part, as well as additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated.

The present invention is not limited to the exemplary embodiments illustrated herein, but is instead characterized by the appended claims, which in no way limit the scope of the disclosure.

What is claimed is:

1. A system for estimating a location of one or more drones, the system comprising:
    a server comprising: a processor, memory accessible by the processor, program instructions and data stored in the server memory;
    wherein data stored in the memory comprises a geolocation dataset that comprises:
        region data representing a travel region for at least one drone; and
        object data representing recorded objects that correspond with real world objects within the travel region, the object data including feature data of recorded objects within the travel region and geo-tagged metadata informing the locations of recorded objects within the travel region;
    wherein the server is configured to estimate a location of the at least one drone by:
        receiving a drone signal comprising data on one or more inputs received at one or more sensors of the drone;
        estimating a geographical location of the drone by:
            matching data from the drone signal with object data for one or more recorded objects in the geolocation dataset to identify one or more objects in the drone signal data as matched recorded objects that correspond with recorded objects in the geolocation dataset;
            estimating a distance of the drone to the one or more matched recorded objects;
            estimating a geographical location of the drone based on the estimated distance of the drone from the one or more matched recorded objects and the geo-tagged metadata of the one or more matched recorded objects; and
        estimating an enhanced geographical location of the drone by:
            identifying region data corresponding with the estimated geographical location of the drone;
            selecting feature data of one or more recorded objects that are associated with the identified region data;
            matching data from the drone signal with the selected feature data to identify one or more objects in the drone signal data as second matched recorded objects that correspond with recorded objects in the geolocation dataset;
            estimating a distance of the drone to the one or more second matched recorded objects; and
            estimating an enhanced geographical location of the drone based on the estimated distance of the drone from the one or more second matched recorded objects and the geo-tagged metadata of the one or more second matched recorded objects.

2. The system of claim 1, wherein the region data in the geolocation dataset comprises data representative of a 3D environment of the planned region; and the server is further configured to estimate a geographical location of the drone by triangulating a position of the drone relative to matched recorded objects and comparing the triangulated position with the data in the geolocation dataset that is representative of a 3D environment of the planned region.

3. The system of claim 1, wherein the server is further configured to iteratively repeat the steps for estimating an enhanced geographical location of the drone, with successive iterations selecting feature data of increasing detail, until an estimated geographical location of the drone is determined within a predetermined degree of precision.

4. The system of claim 3, wherein the server is further configured, when performing successive iterations of the steps for estimating an enhanced geographical location of the drone, to perform an iteration selecting feature data of reduced detail relative to the detail of the selected feature data in a prior iteration when the prior iteration did not yield an increase in precision of an estimated geographical location of the drone.

5. The system of claim 3, wherein the server is configured to select feature data of recorded objects from multiple regions when iteratively estimating an enhanced geographical location.

6. The system of claim 1, wherein the server is further configured to store information obtained from one or more drone signals in the server memory, analyze the stored information to update and improve a 3D representation of the planned region, and distribute the updated 3D representation to at least one of: one or more additional drones, one or more external servers, one or more personal computers, and software running on the server.

7. The system of claim 1, wherein the server is further configured to determine a location of the drone by at least one of:
   calculating a current location of the drone based on a last known location of the drone and an inertial measurement of the drone;
   triangulating a position of the drone relative to matched recorded objects;
   comparing prior-calculated locations of the drone to yield an estimated current location of the drone;
   estimating pointing directions of the drone relative to the one or more matched recorded objects;
   comparing one or more estimated locations of the drone with a GPS location; and
   a combination of one or more of the foregoing.

8. The system of claim 1, further comprising:
   at least one drone comprising:
      one or more sensors for receiving data;
      a drone controller for controlling the drone; and
      one or more communications modules for sending and receiving signals,
   wherein the drone controller comprises a processor, memory accessible by the processor, and program instructions and data stored in the memory.

9. The system of claim 8, wherein
   the drone further comprises an image recognition and location module; and
   the drone controller is configured, in the event of an interruption in receiving a server signal, to execute a drone control algorithm stored in the drone memory for guiding the drone through use of the image recognition and location module until reception of the server signal is reestablished.

10. The system of claim 1, wherein the server is further configured to estimate the enhanced geographical location of the drone by:
   estimating pointing directions of the drone relative to one or more matched recorded objects.

11. The system of claim 10, wherein
   pointing directions of the drone may be estimated relative to the one or more matched recorded objects that are different from the one or more second matched recorded objects from which the relative distance of the drone is estimated.

12. The system of claim 1, wherein the geolocation dataset further comprises travel data representing a planned travel path of the drone through the travel region.

13. The system of claim 12, wherein the object data represents recorded objects that correspond with real world objects along the planned travel path.

14. The system of claim 1, wherein
   the region data includes electromagnetic wave signals from locations within the travel region,
   the object data includes locations of electromagnetic wave signal emission sources within the travel region, and
   the server is configured to navigate the drone based on the detection electromagnetic wave signals.

15. The system of claim 1, wherein the drone comprises an onboard controller configured to execute drone control independent of the server.

16. The system of claim 1, wherein the object data includes shapes of recorded objects.

17. The system of claim 1, wherein the object data includes point clouds of recorded objects.

18. The system of claim 1, wherein the object data includes one or more object features chosen from: object surface data, object edge date, object corner data.

19. The system of claim 1, wherein the server is further configured to estimate a location of an object by:
   receiving a drone signal comprising data on one or more inputs received at one or more sensors of the drone;
   detecting one or more objects with data from the drone signal;
   estimating a distance of the drone to the one or more detected objects;
   estimating a geographical location of the one or more identified objects based on the estimated distance of the drone from the one or more detected objects and the estimated geographical location of the drone.

* * * * *